US011640072B2

(12) United States Patent
Kasahara et al.

(10) Patent No.: US 11,640,072 B2
(45) Date of Patent: *May 2, 2023

(54) OPTICAL UNIT WITH SHAKE-CORRECTION FUNCTION

(71) Applicant: NIDEC SANKYO CORPORATION, Nagano (JP)

(72) Inventors: Shogo Kasahara, Nagano (JP); Shinji Hatano, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 126 days.

This patent is subject to a terminal disclaimer.

(21) Appl. No.: 17/191,664

(22) Filed: Mar. 3, 2021

(65) Prior Publication Data

US 2021/0278692 A1  Sep. 9, 2021

(30) Foreign Application Priority Data

Mar. 4, 2020 (JP) .............................. JP2020-036399

(51) Int. Cl.
*G02B 27/64* (2006.01)
*G02B 7/02* (2021.01)

(52) U.S. Cl.
CPC ............ *G02B 27/646* (2013.01); *G02B 7/02* (2013.01)

(58) Field of Classification Search
USPC ............................................ 359/557; 396/55
See application file for complete search history.

(56) References Cited

U.S. PATENT DOCUMENTS

| 8,089,694 | B2 | 1/2012 | Wernersson |
| 8,224,169 | B2 | 7/2012 | Tsuruta et al. |
| 8,238,736 | B2 | 8/2012 | Tsuruta et al. |
| 8,396,357 | B2 | 3/2013 | Yanagisawa et al. |
| 9,057,883 | B2 | 6/2015 | Yasuda |
| 9,854,172 | B2 | 12/2017 | Ezawa et al. |
| 10,509,195 | B2 | 12/2019 | Lee |

(Continued)

FOREIGN PATENT DOCUMENTS

| CN | 101183203 | 5/2008 |
| CN | 101256333 | 9/2008 |

(Continued)

*Primary Examiner* — Clayton E. LaBalle
*Assistant Examiner* — Warren K Fenwick
(74) *Attorney, Agent, or Firm* — JCIPRNET

(57) ABSTRACT

An optical unit with shake-correction function is provided and includes: a movable body, a rotational support structure, a gimbal mechanism, and a fixed body. The rotational support structure, which rotatably supports the movable body including a camera module around an optical axis, is rotatably supported by the gimbal mechanism around a first axis and a second axis. The rotational support structure includes a first annular groove provided on the movable body, a plate roller including a second annular groove facing the first annular groove in the direction of Z axis, and multiple spherical objects inserted into the first annular groove and the second annular groove. The gimbal mechanism rotatably supports the plate roller around a first axis. The movable body includes a first-side stopper part facing one of plate roller extension portions with a gap from one side in the circumferential direction around the Z axis.

9 Claims, 19 Drawing Sheets

(56) References Cited

U.S. PATENT DOCUMENTS

| | | |
|---|---|---|
| 10,649,226 B2 | 5/2020 | Minamisawa et al. |
| 10,747,013 B2 | 8/2020 | Lim |
| 10,782,591 B2 | 9/2020 | Minamisawa |
| 10,948,737 B2 | 3/2021 | Minamisawa et al. |
| 10,976,640 B2 | 4/2021 | Minamisawa et al. |
| 11,137,569 B2 | 10/2021 | Lee |
| 11,372,261 B2 * | 6/2022 | Hatano .................... G03B 5/02 |
| 2009/0052037 A1 | 2/2009 | Wernersson |
| 2020/0341291 A1 | 10/2020 | Lim |
| 2021/0041715 A1 | 2/2021 | Takei |
| 2021/0041717 A1 | 2/2021 | Takei |
| 2021/0240000 A1 | 8/2021 | Kasahara et al. |
| 2021/0278690 A1 * | 9/2021 | Kasahara ............. G02B 27/646 |
| 2021/0278691 A1 * | 9/2021 | Hatano .................... G02B 7/02 |
| 2021/0278693 A1 * | 9/2021 | Kasahara ............... G02B 7/003 |

FOREIGN PATENT DOCUMENTS

| | | |
|---|---|---|
| CN | 101785296 | 7/2010 |
| CN | 102016708 | 4/2011 |
| CN | 102016709 | 4/2011 |
| CN | 102187273 | 9/2011 |
| CN | 104280977 | 1/2015 |
| CN | 105278208 | 1/2016 |
| CN | 106707454 | 5/2017 |
| CN | 108073011 | 5/2018 |
| CN | 108156367 | 6/2018 |
| CN | 108333791 | 7/2018 |
| CN | 108693678 | 10/2018 |
| CN | 108693680 | 10/2018 |
| CN | 110073286 | 7/2019 |
| CN | 112346281 | 2/2021 |
| CN | 112346283 | 2/2021 |
| CN | 113267937 | 8/2021 |
| JP | 2006106249 | 4/2006 |
| JP | 2015082072 | 4/2015 |
| JP | 2015215546 | 12/2015 |
| JP | 2017097298 | 6/2017 |
| JP | 2019020464 | 2/2019 |
| JP | 2019200270 | 11/2019 |

\* cited by examiner

OPTICAL UNIT WITH SHAKE-CORRECTION FUNCTION

CROSS REFERENCE TO RELATED APPLICATION

The present application claims priority under 35 U.S.C. § 119 to Japanese Application No. 2020-036399 filed on Mar. 4, 2020, and the entire content of which is incorporated herein by reference.

BACKGROUND

Field of the Invention

The present invention relates to an optical unit with shake-correction function for correcting shake by rotating a camera module around an optical axis.

Description of the Related Documents

In an optical unit mounted on a mobile terminal or a mobile body, there is an optical unit that rotates a movable body provided with a camera module, along an optical axis, a first axis perpendicular to the optical axis, and a second axis orthogonal to the optical axis and the first axis, in order to suppress the disturbance of an image captured when the mobile terminal or the mobile body is moved. Japanese Unexamined Patent Publication No. 2015-82072 (Patent Document 1) and Japanese Unexamined Patent Publication No. 2019-200270 (Patent Document 2) describe such an optical unit with shake-correction function.

The optical unit with shake-correction function according to Patent Document 1 has a movable body, a fixed body, and a rotational support structure that rotatably supports the movable body around a predetermined axis with respect to the fixed body. The movable body has a camera module that includes a lens, a support body that surrounds the camera module, and a gimbal mechanism that rotatably supports the camera module around the first axis and the second axis inside the support body. Further, the optical unit with shake-correction function has a rotating magnetic drive structure for rotating the camera module around the first axis and the second axis in the movable body, and a rolling magnet drive structure for rotating the camera module around the optical axis by rotating the movable body around a predetermined axis.

The optical unit with shake-correction function of Patent Document 2 has a movable body that includes a camera module, a rotational support structure that rotatably supports the movable body around an optical axis, a gimbal mechanism, and a fixed body that supports the movable body via the gimbal mechanism and the rotational support structure. The movable body is disposed on the inner circumferential side of the fixed body. The rotational support structure has an intermediate frame body disposed between the movable body and the fixed body, and a plurality of leaf springs spanned between the movable body and the intermediate frame body in the radial direction. The plurality of leaf springs is arranged at equal angular intervals around the optical axis, and allow the movable body to rotate around the optical axis with respect to the intermediate frame body. The gimbal mechanism includes a gimbal frame, a first connecting mechanism that connects a first axis-side extension part and the intermediate frame body to be rotatable around the first axis, and a second connecting mechanism that connects the gimbal frame and the fixed body to be rotatable around the second axis.

In the optical unit with shake-correction function of Patent Document 1, when the camera module is not rotated around the first axis or the second axis, the axis where the rotational support structure rotates the movable body (the rotational axis of the support body) coincides with the optical axis. However, when the camera module rotates around the first axis or the second axis, the rotational axis of the movable body by the rotational support structure and the optical axis of the camera module on the movable body are displaced from each other. Therefore, when the rolling magnet drive structure is driven to rotate the movable body while the camera module rotates around the first axis or the second axis, there is a problem that the camera module does not rotate around the optical axis.

The optical unit with shake-correction function of Patent Document 2 can rotate the movable body around the rotational axis that coincides with the optical axis of the camera module, even when the camera module rotates around the first axis or the second axis. However, since the movable body is rotatably supported by the plurality of leaf springs spanned in the radial direction, there is a problem in that the rotational axis of the movable body becomes unstable due to the elastic deformation of the leaf springs during the rotation.

In the consideration of these points, at least an embodiment of the present invention provides an optical unit with shake-correction function, which can rotate a movable body around a rotational axis coinciding with an optical axis, and prevent or suppress the rotational axis of the movable body from becoming unstable.

SUMMARY

An optical unit with shake-correction function according to at least an embodiment of the present invention includes: a movable body including a camera module, a rotational support structure configured to rotatably support the movable body around an optical axis of a lens of the camera module, a gimbal mechanism configured to rotatably support the rotational support structure around a first axis intersecting the optical axis, and around a second axis intersecting the optical axis and the first axis, and a fixed body configured to support the movable body via the gimbal mechanism and the rotational support structure. The rotational support structure includes: a first annular groove provided on the movable body in a state of being coaxial with the optical axis; a plate roller including a second annular groove facing the first annular groove in the direction of the optical axis; and a plurality of spherical objects inserted into the first annular groove and the second annular groove to roll between the movable body and the play roller. The plate roller includes: a plate roller annular portion including the second annular groove; and a pair of plate roller extension portions being protruded from the plate roller annular portion toward both sides in a direction of the first axial. The gimbal mechanism is configured to rotatably support each of the pair of plate roller extension portions around the first axis on the first axis. The movable body includes a first stopper part to face one of the pair of plate roller extension portions with a gap from one side in a circumferential direction around the optical axis.

According to at least an embodiment of the present invention, the rotational support structure, which rotatably supports the movable body around the optical axis, is rotatably supported by the gimbal mechanism around the first axis and the second axis. Therefore, even in a state where the movable body rotates around the first axis or the second axis, it is possible to rotate the movable body around a rotational axis which coincides with the optical axis. Further, the rotational support structure includes a plurality of spherical objects that are inserted into the first annular groove provided on the movable body and the second annular groove provided on the plate holder, and roll. Therefore, the rotational axis of the movable body does not become unstable as compared with the case where the movable body is rotatably supported by the plurality of leaf springs. Further, in the rotational support structure, the first annular groove, which faces the second annular groove of the plate holder in the direction of the optical axis, is provided on the movable body. Therefore, it is possible to miniaturize the rotational support structure in the direction of the optical axis as compared with the case where the first annular groove is provided on a member separate from the movable body. Further, the movable body includes a first-side stopper part, which faces the extension part supported on the first axis by the gimbal mechanism with a gap from one side in the circumferential direction. Therefore, it is possible to define an angular range in which the movable body rotates on one side around the optical axis by the first-side stopper part.

According to at least an embodiment of the present invention, the movable body may include: a holder made of metal configured to hold the camera module, an annular first rail member configured to be fixed to the holder and surround the optical axis, and a stopper mechanism being fixed to the holder. Further, the first rail member may include the first annular groove. Further, the stopper mechanism may be made of metal and include the first-side stopper part. According to this configuration, the first-side stopper part and the first annular groove are provided on a different member from the holder. Therefore, it is possible to simplify the shape of the holder as compared to the case where the holder is provided with the first-side stopper part and the first annular groove. Therefore, it is possible to easily manufacture the holder. Further, since the holder and the stopper mechanism are made of metal, it is possible to fix the holder and the stopper mechanism by welding. Therefore, even when a force is applied to the stopper mechanism from the circumferential direction by abutting the first-side stopper part against the plate holder, it is easy to prevent the stopper mechanism from falling out from the holder. Further, since the stopper mechanism is made of metal, it is possible to prevent dust from being generated from the stopper mechanism even when the first-side stopper part abuts against the plate holder.

In at least an embodiment of the present invention, the rotational support structure may include: a pressurization structure, configured to apply a force for bringing the first annular groove and the second annular groove closer to each other in the direction of the optical axis. The plate roller may be non-magnetic. The pressurization structure may include: a first magnetic component, being fixed to one of the pair of plate roller extension portions; a second magnetic component, being fixed to the other of the pair of plate roller extension portion; and a first magnet and a second magnet which are fixed to the holder. The stopper mechanism may include: a first positioning portion configured to arrange the first magnet at a position overlapping with the first magnetic component when viewed from the direction of the optical axis; and a second positioning portion configured to arrange the second magnet in a position overlapping with the second magnetic component when viewed from the direction of the optical axis. According to this configuration, it becomes easy to fix the magnet of the pressurization structure to the holder.

In at least an embodiment of the present invention, the plate roller may include: a plate roller protruding portion, configured to be protruded from the plate roller annular portion toward an outer circumference side between the pair of plate roller extension portions in the circumferential direction. The movable body may include: a second-side stopper part configured to face the plate roller protruding portion with a gap from the other side in the circumferential direction, and the second-side stopper part may be provided on the stopper mechanism. According to this configuration, it is possible to define an angular range in which the movable body rotates on the other side around the optical axis by the second-side stopper part.

In at least an embodiment of the present invention, the pressurization structure may include: a third magnetic component fixed to the plate roller protruding portion, and a third magnet fixed to the holder. The stopper mechanism may include: a third positioning portion configured to arrange the third magnet at a position overlapping with the third magnetic component when viewed from the direction of the optical axis. According to this configuration, it becomes easier to secure a force for bringing the first annular groove and the second annular groove closer to each other in the direction of the optical axis by the pressurization structure. Further, it becomes easy to fix the third magnetic component to the holder.

In at least an embodiment of the present invention, the movable body may include: a second stopper mechanism fixed to the stopper mechanism. The second stopper mechanism may include: a stopper part configured to face the plate roller annular portion with a predetermined gap from the direction of the optical axis on the side opposite to the second annular groove of the plate roller annular portion in the direction of the optical axis. According to this configuration, it is possible to prevent the spherical object from falling out from between the plate holder and the movable body by the first annular groove and the second annular groove being excessively spaced apart from each other in the direction of the optical axis.

In at least an embodiment of the present invention, the holder may be made of a magnetic material. The optical unit further may include: a rolling corrective-magnet drive structure, configured to rotate the movable body around the optical axis. The rolling corrective-magnet drive structure may include: a rolling corrective magnet fixed to the holder, and a rolling corrective coil fixed to the fixed body. When the holder made of metal is made of the magnetic material, the holder functions as a yoke of the rolling corrective magnet. Therefore, it is easy to secure the driving force of the rolling corrective-magnet drive structure.

In at least an embodiment of the present invention, the movable body may include a second-side stopper part configured to face one of the pair of plate roller extension portions with a gap from the other side in the circumferential direction. According to this configuration, it is possible to define an angular range in which the movable body rotates on the other side around the optical axis by the second-side stopper part.

Further, the movable body may include a second-side stopper part to face the other of the pair of plate roller extension portions with a gap from the other side in the circumferential direction. According to this configuration, it is possible to define an angular range in which the movable body rotates on the other side around the optical axis by the second-side stopper part.

According to at least an embodiment of the present invention, the rotational support structure, which rotatably supports the movable body around the optical axis, is rotatably supported by the gimbal mechanism around the first axis and the second axis. Therefore, even in a state where the movable body rotates around the first axis or the second axis, it is possible to rotate the movable body around the rotational axis which coincides with the optical axis. Further, the rotational support structure includes the plurality of spherical objects that are inserted into the first annular groove provided on the movable body and the second annular groove provided on the plate holder and roll. Therefore, the rotation of the movable body is stabilized. Further, the first annular groove of the rotational support structure is provided on the movable body. Therefore, as compared to the case where the first annular groove is provided on a member separate from the movable body, it is possible to reduce the size of the rotational support structure in the direction of the optical axis. Further, the movable body includes the first-side stopper part, which faces the extension part supported on the first axis by the gimbal mechanism with a gap from one side in the circumferential direction. Therefore, it is possible to define an angular range in which the movable body rotates on one side around the optical axis by the first-side stopper part.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, embodiments of an optical unit with shake-correction function to which at least an embodiment of the present invention is applied will be described with reference to the drawings.

Overall Configuration

Figure 1:
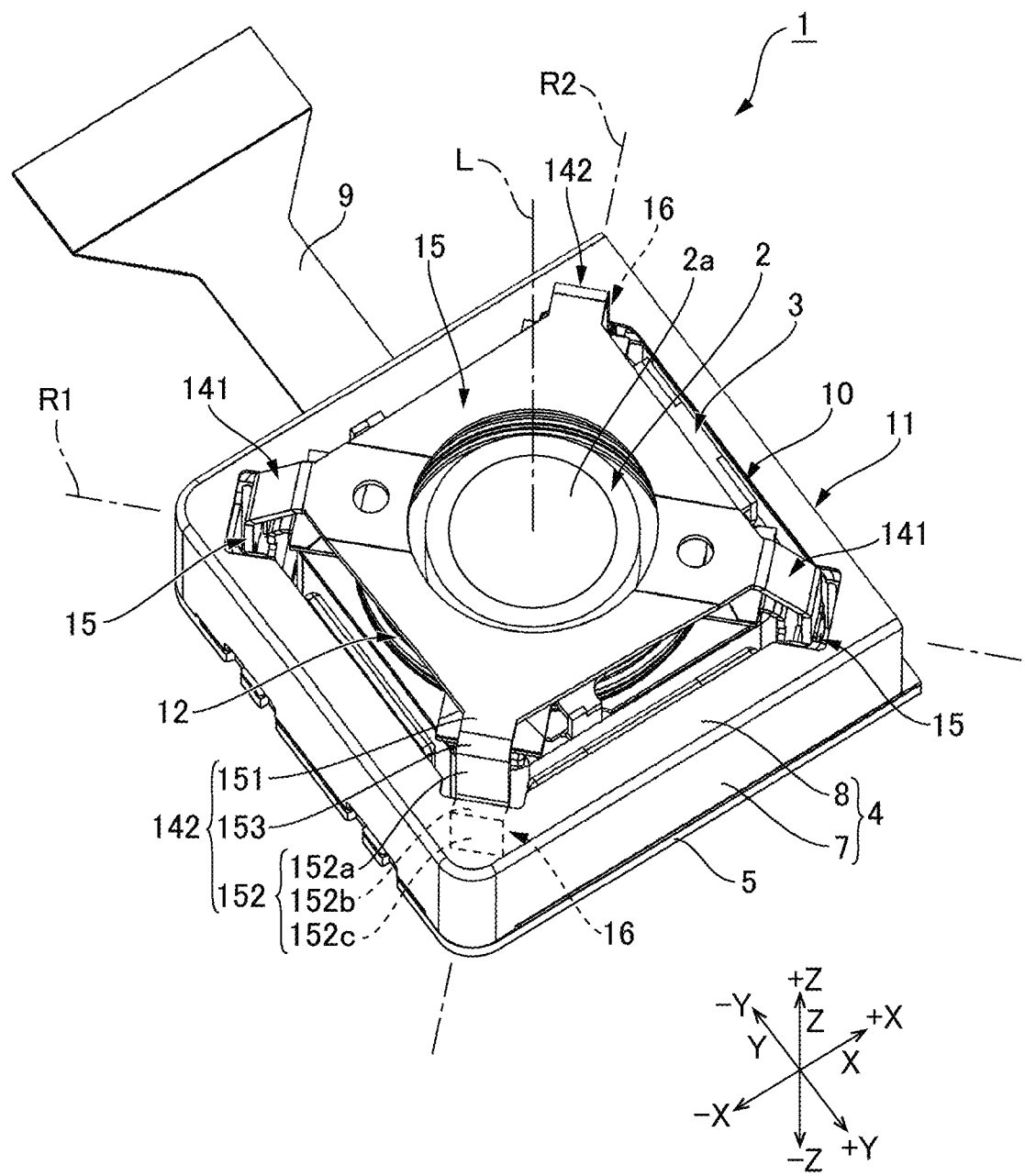
FIG. 1 is a perspective view of an optical unit with shake-correction function.
Figure 2:
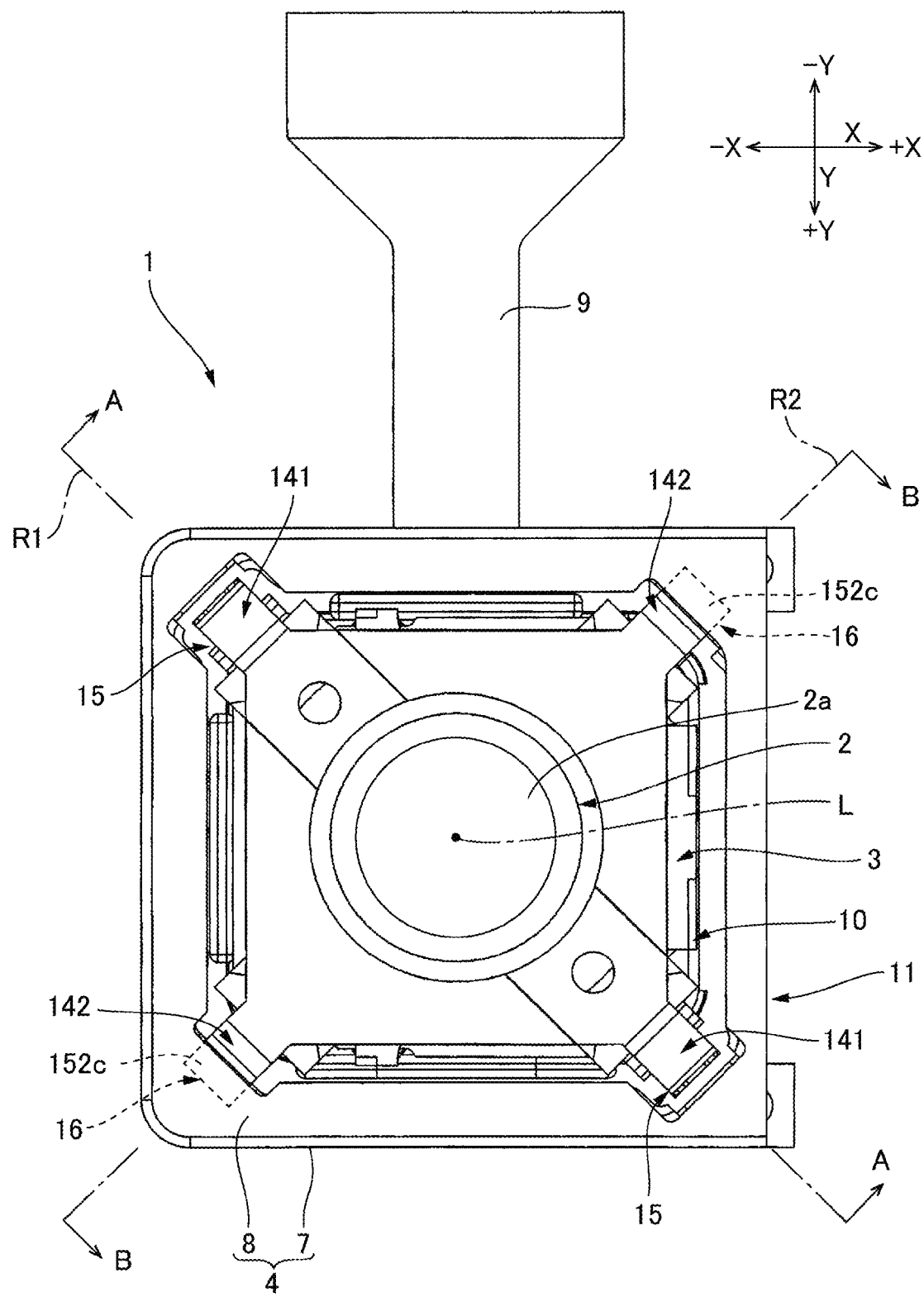
FIG. 2 is a plan view of the optical unit with shake-correction function when viewed from an object side.
Figure 3:
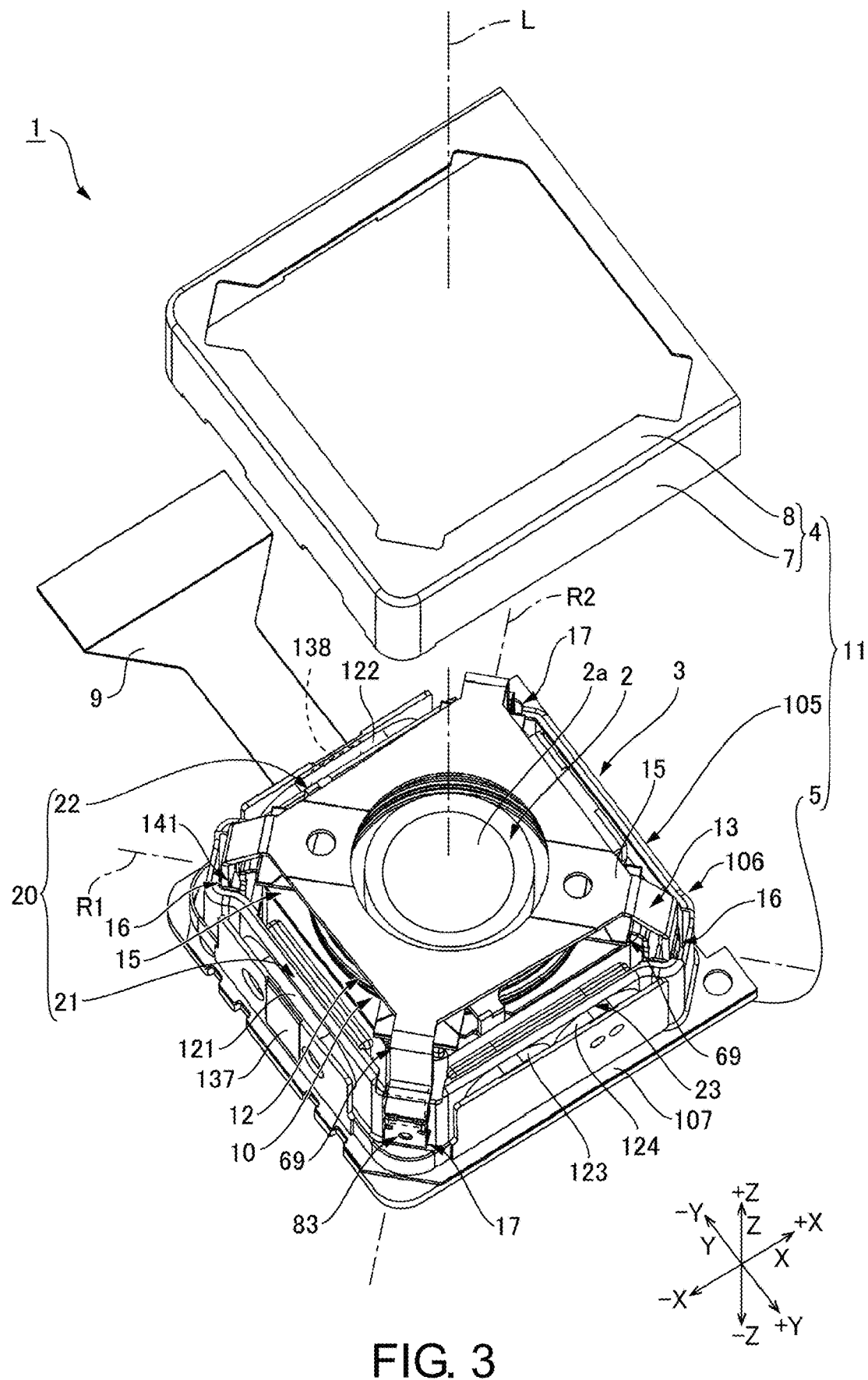
FIG. 3 is an exploded perspective view of the optical unit with shake-correction function.
Figure 4:
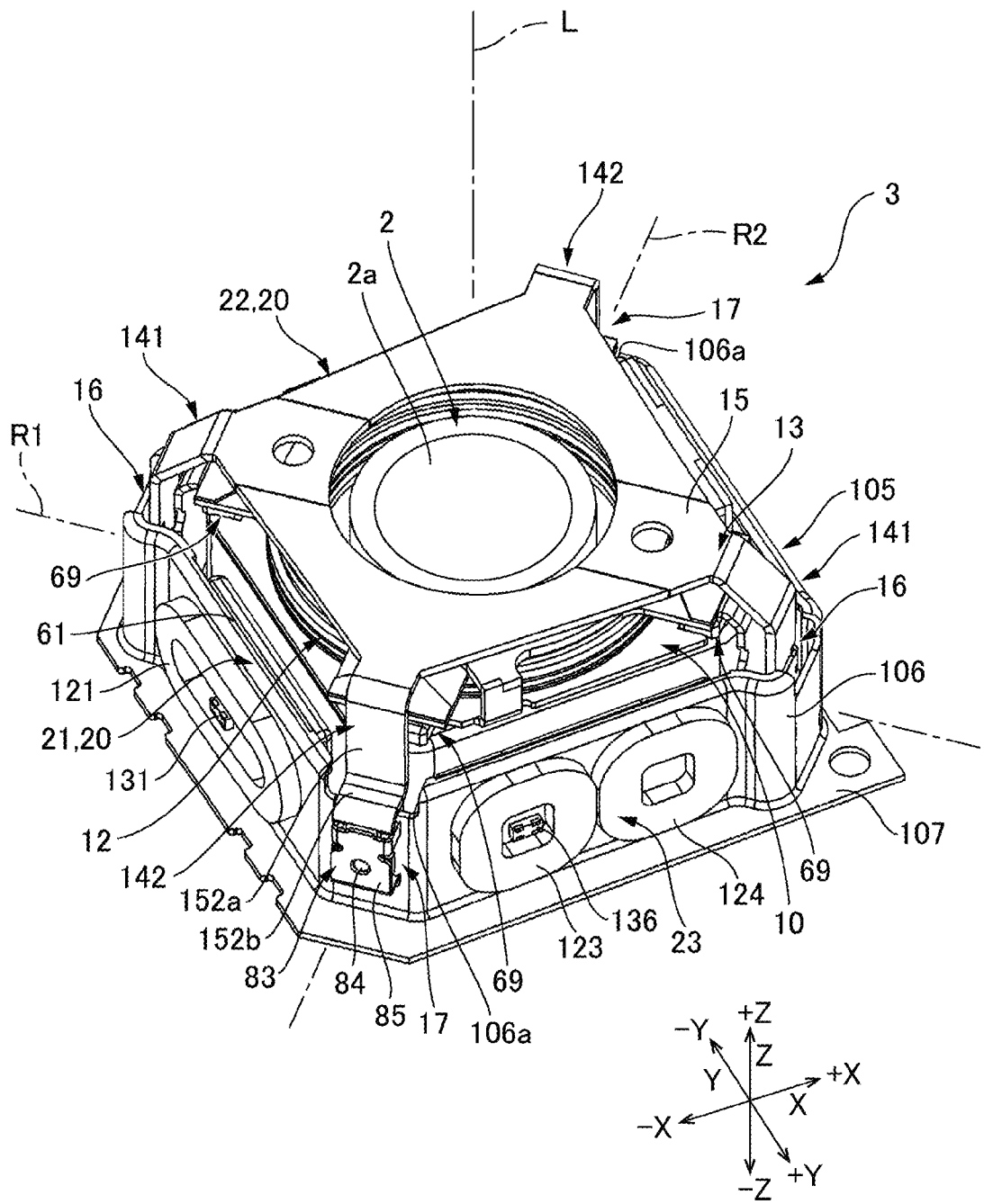
FIG. 4 is a perspective view of an optical unit main body.
Figure 5:
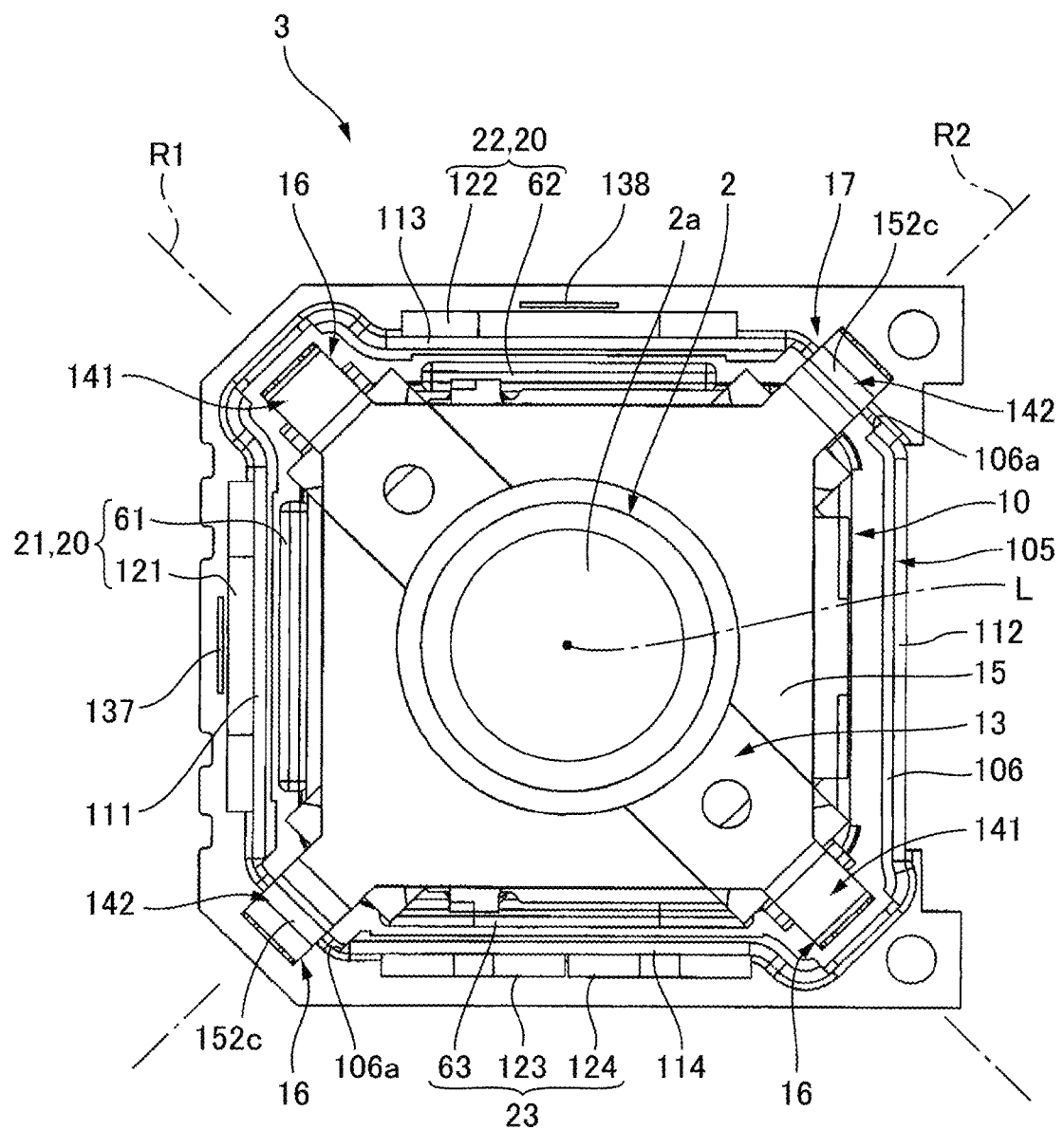
FIG. 5 is a plan view of the optical unit main body.
Figure 6:
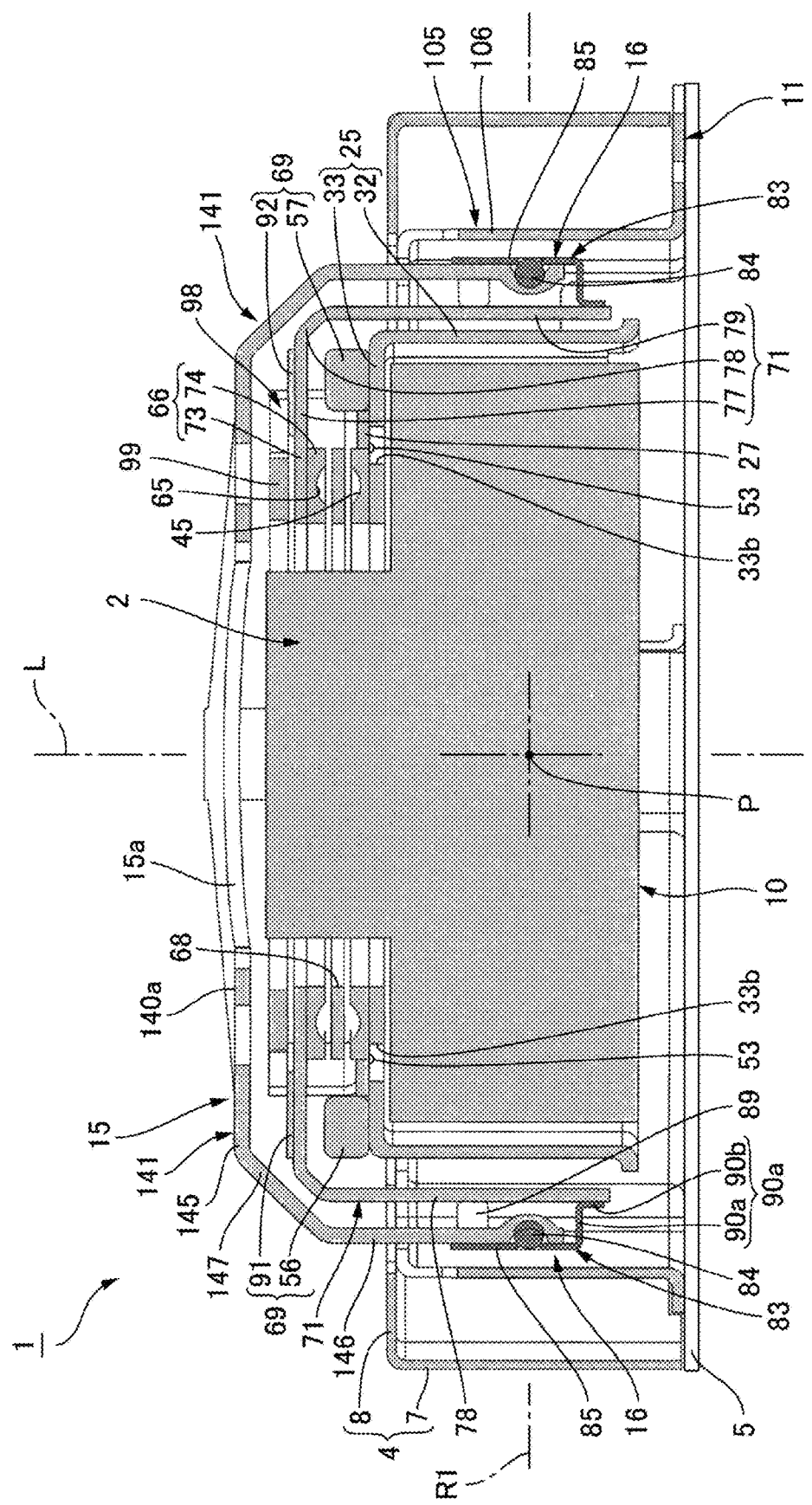
FIG. 6 is a cross-sectional view taken along the line A-A of FIG. 2.
Figure 7:
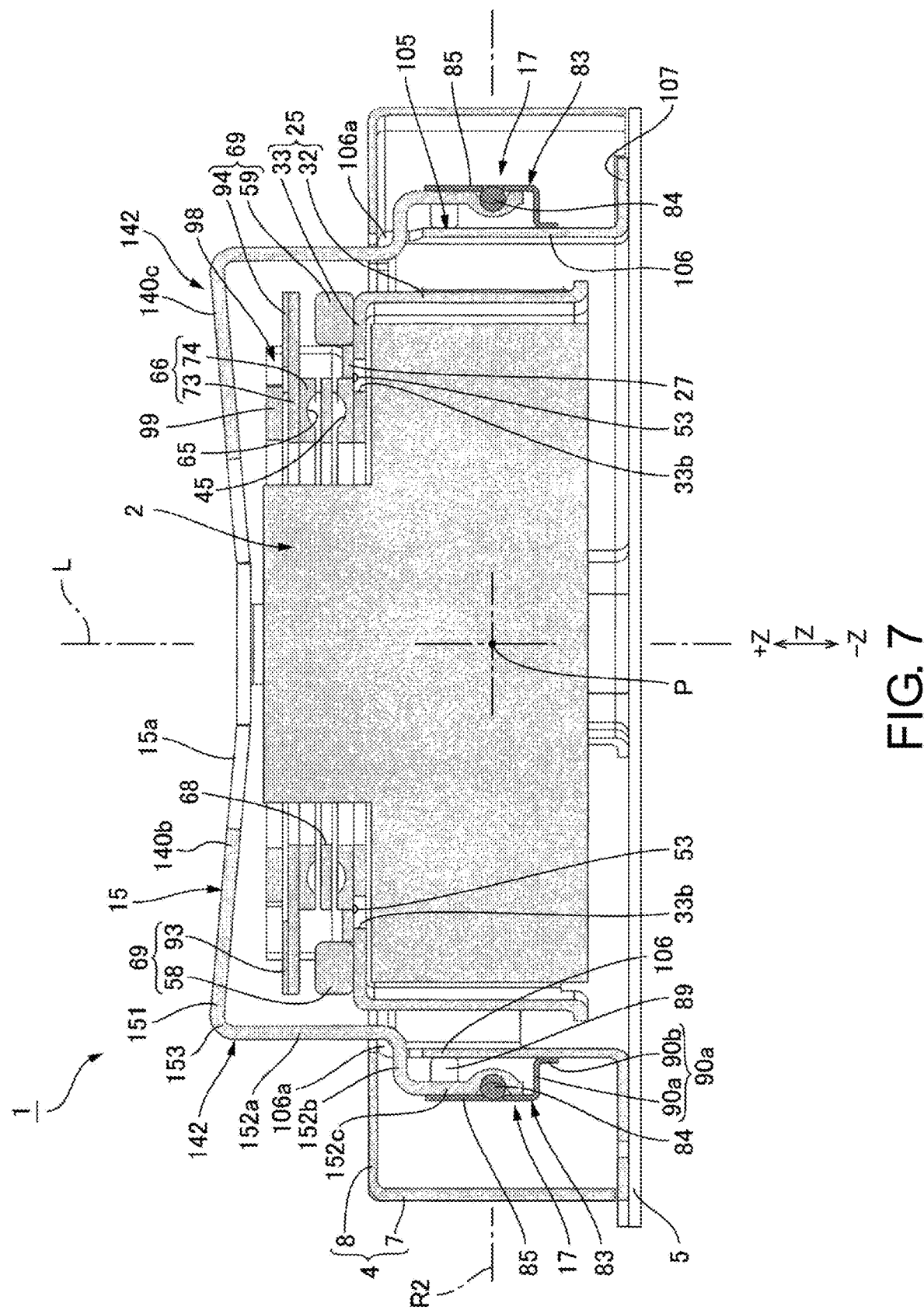
FIG. 7 is a cross-sectional view taken along the line B-B of FIG. 2.

FIG. 1 is a perspective view of an optical unit with shake-correction function. FIG. 2 is a plan view of the optical unit with shake-correction function when viewed from an object side. FIG. 3 is an exploded perspective view of the optical unit with shake-correction function. FIG. 4 is a perspective view of an optical unit main body. In FIG. 4, a base, a flexible printed board, a first magnetic plate, and a second magnetic plate are omitted. FIG. 5 is a plan view of the optical unit main body. In FIG. 5, the base and the flexible printed board are omitted. FIG. 6 is a cross-sectional view taken along the line A-A of FIG. 2. FIG. 7 is a cross-sectional view taken along the line B-B of FIG. 2.

As illustrated in FIG. 1, the optical unit 1 with shake-correction function includes an optical unit main body 3 that includes a camera module 2, a cover 4 that accommodates the optical unit main body 3, and a base 5 that covers the optical unit main body 3 from the counter object side. The cover 4 includes a cover frame portion 7 with a substantially rectangular shape that covers the optical unit main body 3 from the outer circumference side, and an object-side end plate portion 8 with a frame shape that protrudes toward the inner circumferential side from the edge of the cover frame portion 7 on the object side. The base 5 has a plate shape. The camera module 2 includes a lens 2a, and an imaging element (not illustrated) disposed on an optical axis L of the lens 2a. Further, as illustrated in FIG. 3, the optical unit main body 3 includes a flexible printed board 9 that is routed along the outer circumference surface of the optical unit main body 3.

The optical unit 1 with shake-correction function is used, for example, in an optical device such as a camera-equipped mobile phone or a drive recorder, or an optical device such as an action camera or a wearable camera mounted on a moving object such as a helmet, a bicycle, or a radio-control helicopter. In such an optical device, when the optical device shakes during capturing, the captured image is distorted. The optical unit 1 with shake-correction function corrects the inclination of the camera module 2, based on the acceleration, the angular velocity, the shake amount, and the like, which are detected by a detection unit such as a gyroscope, in order to prevent the captured image from being inclined.

The optical unit 1 with shake-correction function of the present example rotates the camera module 2 around the optical axis L of the lens 2a, around a first axis R1 orthogonal to the optical axis L, and around a second axis R2 orthogonal to the optical axis L and the first axis R1 to perform shake correction.

In the following description, the three axes orthogonal to one another are referred to as the direction of the X axis, the direction of the Y axis, and the direction of the Z axis. Further, one side in the direction of the X axis is referred to as a −X direction, and the other side is referred to as a +X direction. One side in the direction of the Y axis is referred as a −Y direction, and the other side is referred as a +Y direction. One side in the direction of the Z axis is referred to as a −Z direction, and the other side is referred to as a +Z direction. The direction of the Z axis is the direction of the optical axis. The −Z direction is a counter-object side of the camera module 2. The +Z direction is an object side of the camera module 2. The first axis R1 and the second axis R2 are inclined by 45 degrees with respect to the X axis and the Y axis around the Z axis (around the optical axis).

As illustrated in FIG. 2, the optical unit 1 with shake-correction function includes a movable body 10 that includes the camera module 2, and a fixed body 11 that surrounds the movable body 10 from the outside. The fixed body 11 includes the cover 4 and the base 5. As illustrated in FIG. 3, the optical unit main body 3 includes a rotational support structure 12 and a gimbal mechanism 13. The rotational support structure 12 rotatably supports the movable body 10 around the Z axis. The gimbal mechanism 13 rotatably supports the rotational support structure 12 around the first axis R1 and the second axis R2.

The gimbal mechanism 13 includes a gimbal frame 15, and a first connecting mechanism 16 that connects the gimbal frame 15 and the rotational support structure 12 so as to be rotatable around the first axis R1. The first connecting mechanism 16 is provided on both sides of the gimbal frame 15 in the direction of the first axis R1. Further, the gimbal mechanism 13 includes a second connecting mechanism 17 that connects the gimbal frame 15 and the fixed body 11 so as to be rotatable around the second axis R2. The second connecting mechanism 17 is provided on both sides of the gimbal frame 15 in the direction of the second axis R2. Accordingly, the movable body 10 is rotatably supported by the fixed body 11 around the first axis R1 and the second axis R2 via the rotational support structure 12 and the gimbal mechanism 13.

Further, the optical unit main body 3 includes a shake corrective-magnet drive structure 20 for rotating the movable body 10 around the first axis R1 and around the second axis R2. The shake corrective-magnet drive structure 20 includes a first shake corrective-magnet drive structure 21 that generates a driving force around the Y axis with respect to the movable body 10, and a second shake corrective-magnet drive structure 22 that generates a driving force around the X axis with respect to the movable body 10. The first shake corrective-magnet drive structure 21 and the second shake corrective-magnet drive structure 22 are arranged in the circumferential direction around the Z axis. In the present example, the first shake corrective-magnet drive structure 21 is disposed in the −X direction of the camera module 2. The second shake corrective-magnet drive structure 22 is disposed in the −Y direction of the camera module 2.

The movable body 10 rotates around the X axis and the Y axis by combining the rotation around the first axis R1 and the rotation around the second axis R2. Accordingly, the optical unit 1 with shake-correction function performs pitching correction around the X axis, yawing correction around the Y axis, and rolling correction around the Z axis.

Further, the optical unit main body 3 includes a rolling corrective-magnet drive structure 23 for rotating the movable body 10 around the Z axis. The first shake corrective-magnet drive structure 21, the second shake corrective-magnet drive structure 22, and, and the rolling corrective-magnet drive structure 23 are arranged in the circumferential direction around the Z axis. In the present example, the rolling corrective-magnet drive structure 23 is disposed in the +Y direction of the camera module 2. The rolling corrective-magnet drive structure 23 is located on the side opposite to the second shake corrective-magnet drive structure 22 with the optical axis L interposed therebetween.

Movable Body

Figure 8:
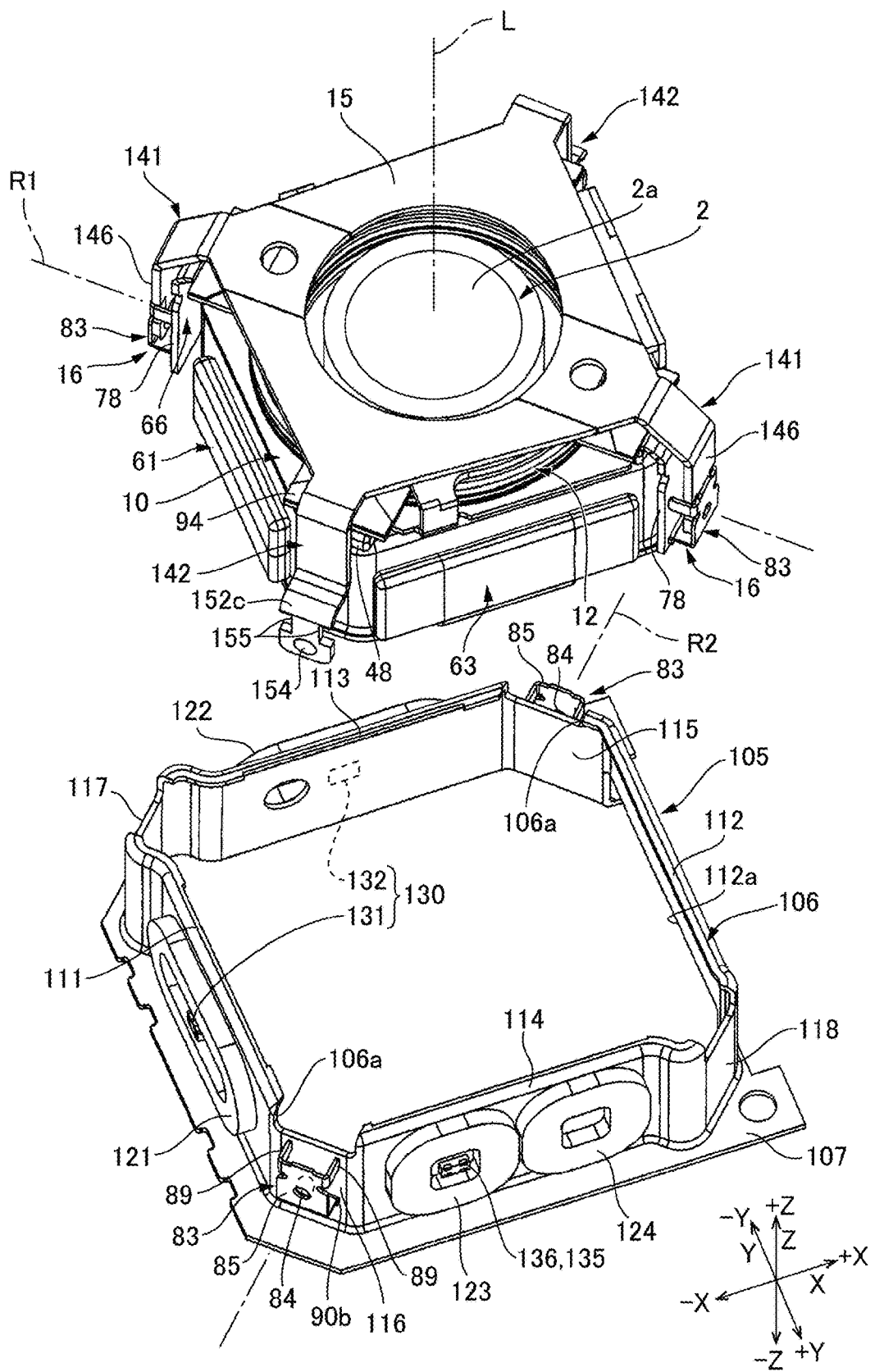
FIG. 8 is an exploded perspective view of the optical unit main body.
Figure 9:
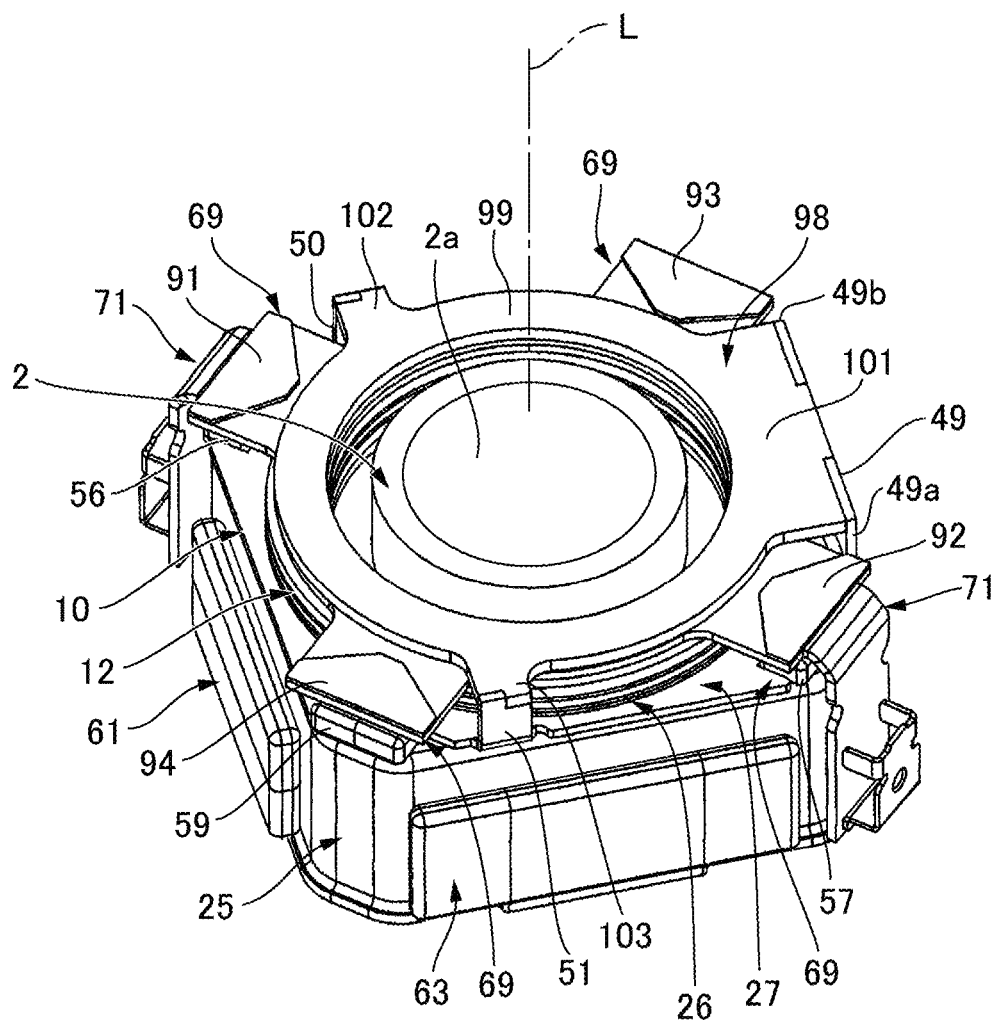
FIG. 9 is a perspective view of a movable body and a rotational support structure.
Figure 10:
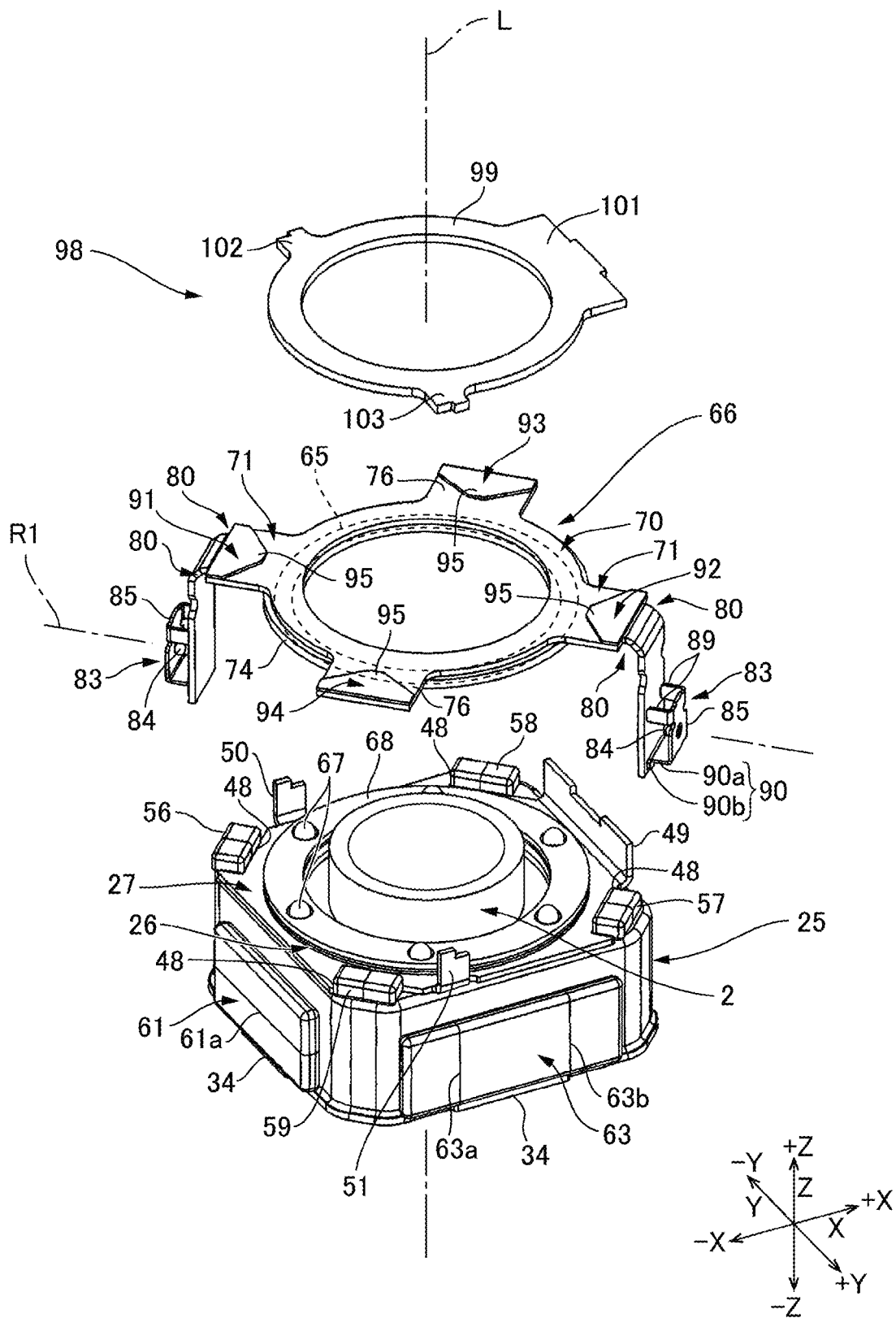
FIG. 10 is an exploded perspective view of the movable body and the rotational support structure.
Figure 11:
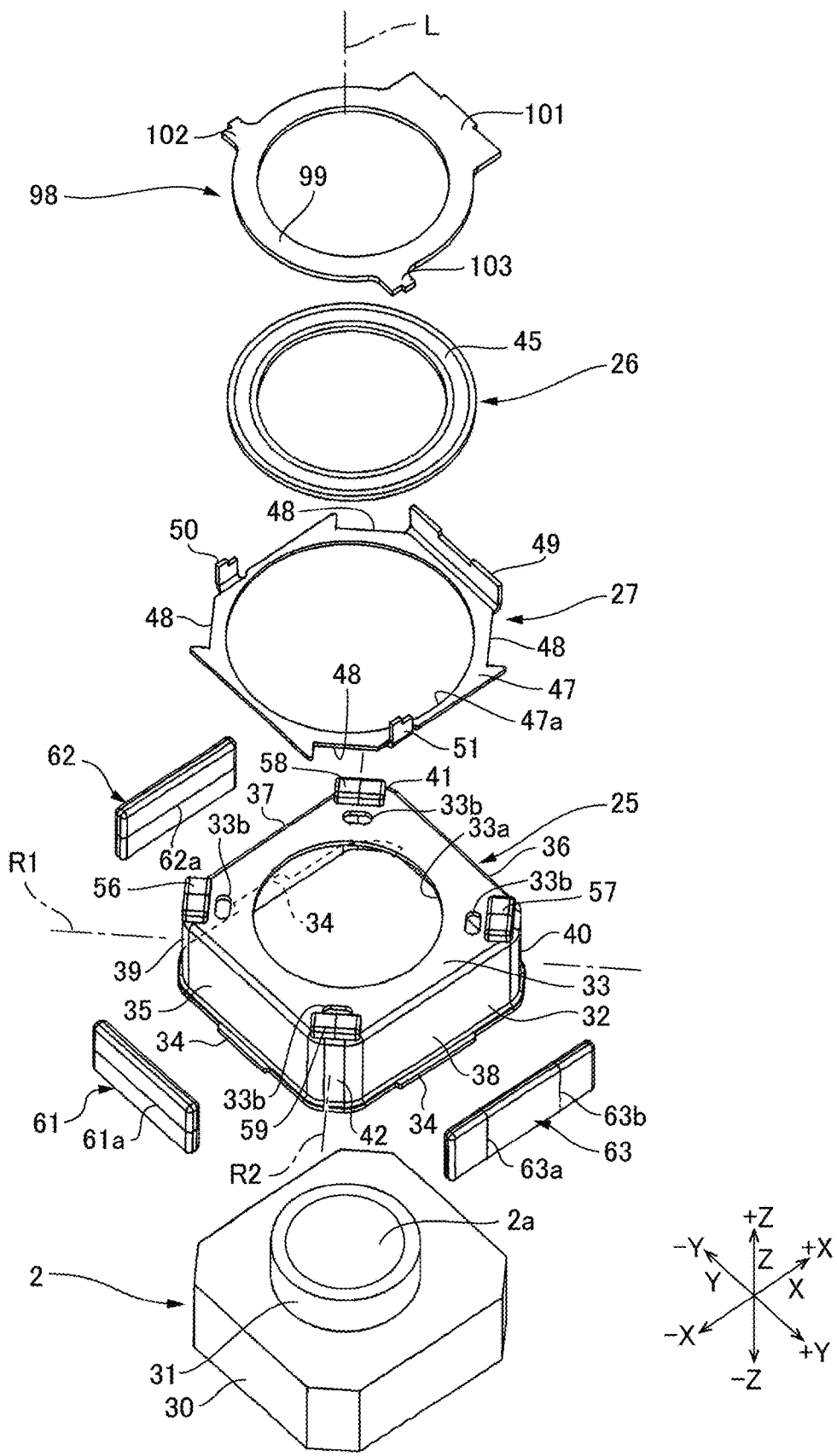
FIG. 11 is an exploded perspective view of the movable body.
Figure 12:
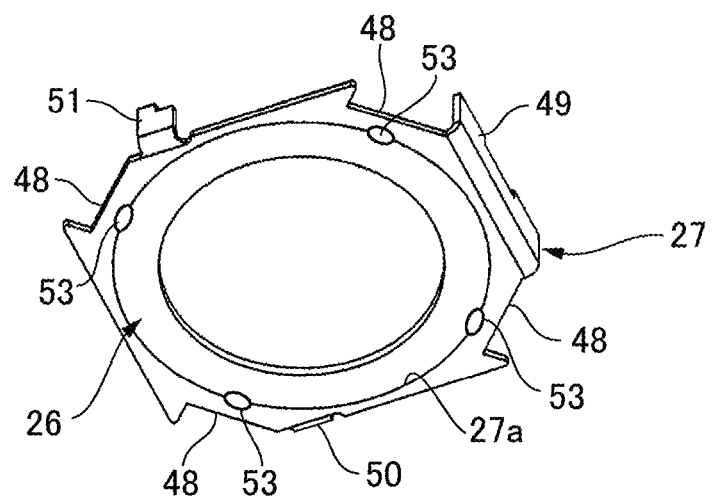
FIG. 12 is a perspective view of a first rail member and a stopper mechanism.
Figure 13:
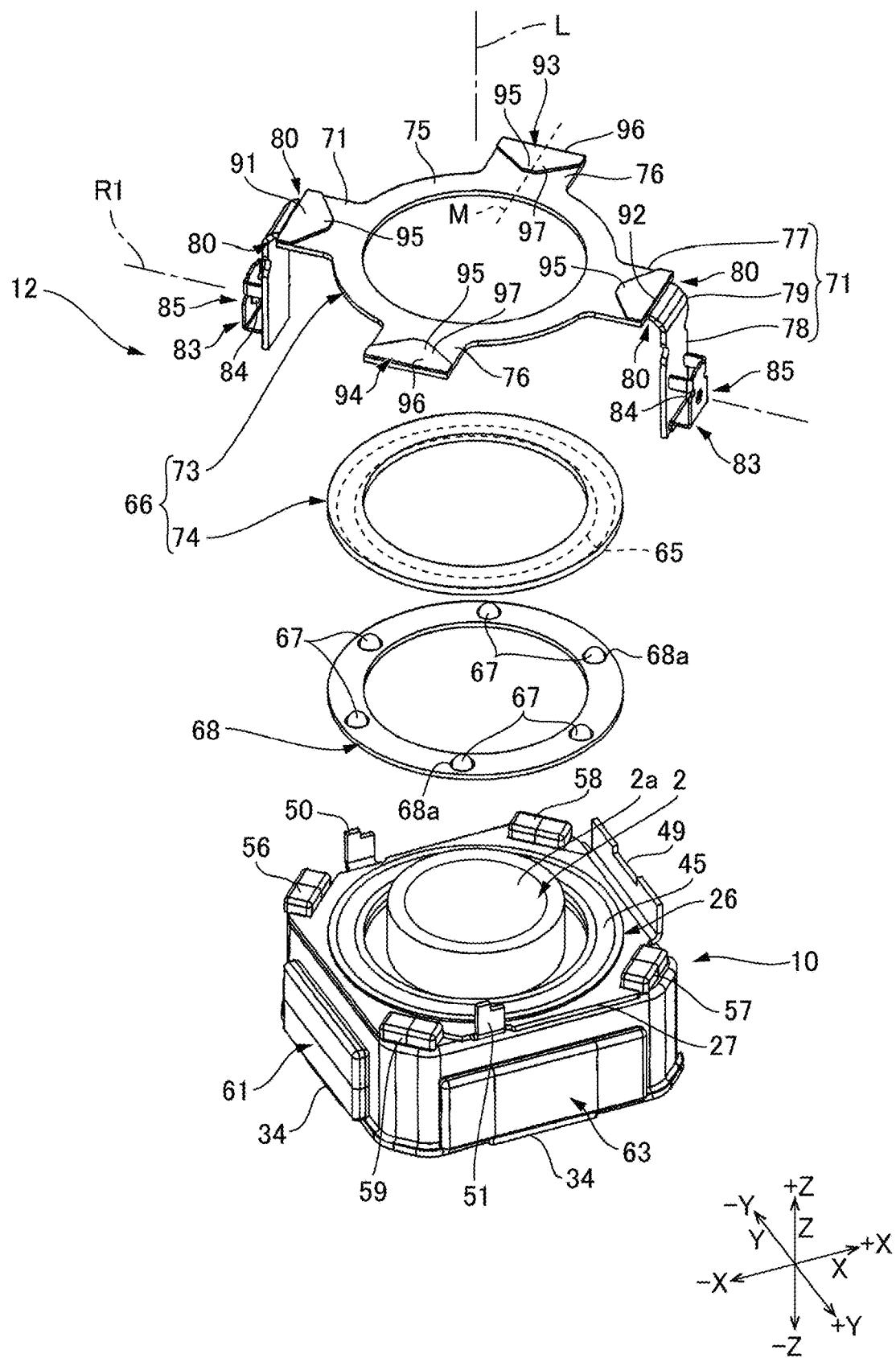
FIG. 13 is an exploded perspective view of the rotational support structure when viewed from an object side.
Figure 14:
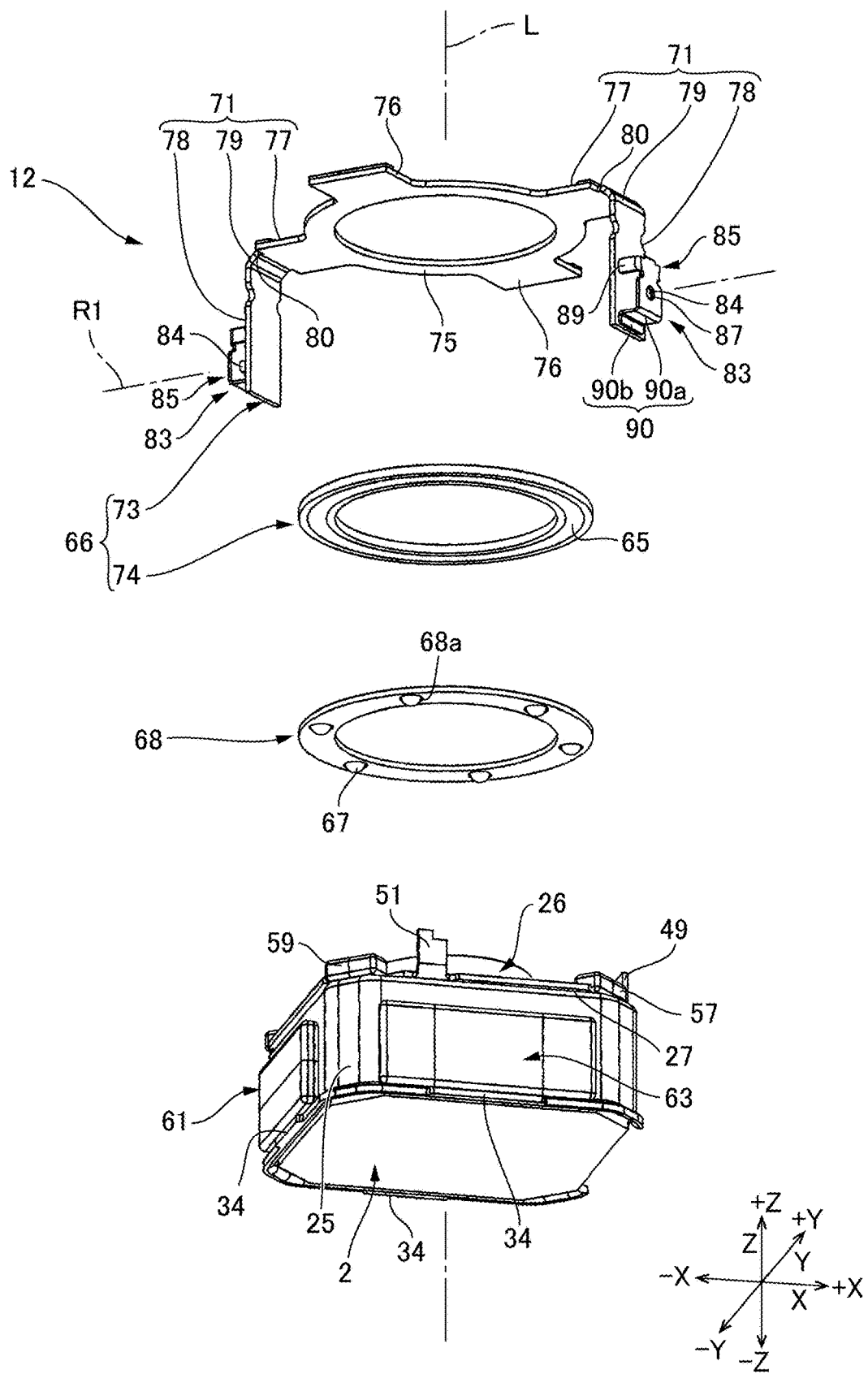
FIG. 14 is an exploded perspective view of the rotational support structure when viewed from the counter object side.

FIG. 8 is an exploded perspective view of the optical unit main body 3. FIG. 9 is a perspective view of the movable body 10 and the rotational support structure 12. FIG. 10 is an exploded perspective view of the movable body 10 and the rotational support structure 12. FIG. 11 is an exploded perspective view of the movable body. FIG. 12 is a perspective view of the first rail member and the stopper mechanism. In FIG. 12, the first rail member and the stopper mechanism are viewed from the −Z direction. FIG. 13 is an exploded perspective view of the rotational support structure 12 and the movable body 10 when viewed from the +Z direction. FIG. 14 is an exploded perspective view of the rotational support structure 12 and the movable body 10 when viewed from the −Z direction.

As illustrated in FIGS. 10 and 11, the movable body 10 includes the camera module 2, a holder 25 that holds the camera module 2, a first rail member 26 that is fixed to the holder 25, and a stopper mechanism 27 that is fixed to the holder 25.

As illustrated in FIG. 11, the camera module 2 includes a camera module main body portion 30, and a camera module cylindrical portion 31 that protrudes from the center of the camera module main body portion 30 in the +Z direction. The lens 2a is accommodated in the camera module cylindrical portion 31. The holder 25 includes a holder frame portion 32 that surrounds the camera module main body portion 30 from the outer circumference side, a holder end plate portion 33 with a frame shape that bends from the end of the holder frame portion 32 in the +Z direction toward the inner circumferential side, and a holder flange portion 34 that bends from the end of the holder frame portion 32 in the −Z direction toward the outer circumference side. The holder 25 is made of magnetic metal.

The holder end plate portion 33 includes a circular opening 33a coaxial with the optical axis L. The camera module cylindrical portion 31 penetrates the circular opening 33a. The holder end plate portion 33 extends in a direction orthogonal to the optical axis L along the surface of the camera module main body portion 30 in the +Z direction. The holder end plate portion 33 includes through-holes 33b that penetrate the holder end plate portion 33 in the direction of the Z axis at both sides of the first axis R1 where the sides sandwich the circular opening 33a. Further, the holder end plate portion 33 includes the through-holes 33b that penetrate the holder end plate portion 33 in the direction of the Z axis at both sides of the second axis R2 where the sides sandwich the circular opening 33a.

The holder frame portion 32 has an approximately octagonal shape when viewed from the +Z direction. The holder frame portion 32 includes a first side wall 35 and a second side wall 36 which extend parallel to the Y direction, and a third side wall 37 and a fourth side wall 38 which extend parallel to the X direction. The first side wall 35 is located in the −X direction of the second side wall 36. The third side wall 37 is located in the −Y direction of the fourth side wall 38. Further, the holder frame portion 32 includes a fifth side wall 39 and a sixth side wall 40 which are located diagonally in the direction of the first axis R1 direction, and a seventh side wall 41 and an eighth side wall 42 which are located diagonally in the direction of the second axis R2. The fifth side wall 39 is located in the −X direction of the sixth side wall 40. The seventh side wall 41 is located in the −Y direction of the eighth side wall 42.

The holder flange portion 34 is provided on the first side wall 35, the third side wall 37 (see FIG. 14), and the fourth side wall 38. The holder flange portion 34 protrudes in a direction orthogonal to the optical axis L.

The first rail member 26 has an annular shape, and is made of non-magnetic metal. A first annular groove 45 is provided on the end surface of the first rail member 26 in the +Z direction. In the present example, the first annular groove 45 is formed by cutting.

The stopper mechanism 27 is made of non-magnetic metal. The stopper mechanism 27 includes a board 47 having an opening 47a to which the first rail member 26 is fitted in the center thereof. The board 47 includes notches 48 at two outer circumferential side portions that overlap with the first axis R1 when viewed from the direction of the Z axis on the edge of the outer circumferential side. Further, the board 47 includes notches 48 at two outer circumferential side portions that overlap with the second axis R2 when viewed from the direction of the Z axis on the edge of the outer circumferential side. Further, the stopper mechanism 27 includes, on the edge of the outer circumferential side of the board 47, a first bent portion 49 that bends in the +Z direction from the edge of the outer circumferential side portion located in the +X direction of the opening 47a, and a second bent portion 50 that bends in the +Z direction from the edge of the outer circumferential side portion located in the −Y direction of the opening 47a, and a third bent portion 51 that bends in the +Z direction from the edge of the outer circumferential side portion located in the +Y direction of the opening 47a. The first bent portion 49 has a width in the circumferential direction that is longer than that of each of the second bent portion 50 and the third bent portion 51.

As illustrated in FIGS. 12 and 13, the first rail member 26 is fixed to the stopper mechanism 27 by welding in a state of being fitted into the opening 47a of the stopper mechanism 27. Thereafter, the first rail member 26 is fixed to the holder end plate portion 33 by welding together with the stopper mechanism 27.

More specifically, in the first rail member 26 and the stopper mechanism 27, the opening edge of the opening 47a of the stopper mechanism 27 and the edge of the outer circumferential side of the first rail member 26 are welded from the −Z direction. Further, the welding is performed at four locations at equal angular intervals around the Z axis. As a result, as illustrated in FIG. 12, four welding marks 53, which fix the first rail member 26 and the stopper mechanism 27 to each other, are provided on the surface of the first rail member 26 and the stopper mechanism 27 on the side of the holder end plate portion 33.

Next, the first rail member 26 and the stopper mechanism 27, which are integrated by welding, are welded to the holder end plate portion 33. Here, when the first rail member 26 and the stopper mechanism 27 are welded to the holder end plate portion 33, the four welding marks 53 are inserted into the four through-holes 33b (see FIG. 11) of the holder end plate portion 33, respectively. Accordingly, the welding marks 53 are received in the through-holes 33b, respectively. Therefore, the first rail member 26 and the stopper mechanism 27 are fixed to the holder 25 in a state of being in close contact with the holder end plate portion 33. In a state in which the first rail member 26 and the stopper mechanism 27 are fixed to the holder 25, as illustrated in FIG. 13, the first rail member 26 is perpendicular to the optical axis L, and the first annular groove 45 is coaxial with the optical axis L.

Further, a first magnet 56, a second magnet 57, a third magnet 58, and a fourth magnet 59 are fixed to the holder end plate portion 33. The first magnet 56, the second magnet 57, the third magnet 58, and the fourth magnet 59 are arranged at four locations at equal angular intervals in the circumferential direction around the Z axis. The first magnet 56 and the second magnet 57 are fixed to the edge portions on both sides of the circular opening 33a in the direction of the first axis R1 in the holder end plate portion 33. The third magnet 58 and the fourth magnet 59 are fixed to the edge portions on both sides of the circular opening 33a in the direction of the second axis R2 in the holder end plate portion 33. Each of the magnets 56 to 59 is magnetized with two poles in the circumferential direction. The magnetic polarization lines of the magnets 56 to 59 extend in the radial direction from the respective centers of the magnets 56 to 59 in the circumferential direction.

Here, the first magnet 56, the second magnet 57, the third magnet 58, and the fourth magnet 59 are fixed to the holder end plate portion 33 after the first rail member 26 and the stopper mechanism 27 are welded to the holder end plate portion 33. When the first magnet 56 and the second magnet 57 are fixed to the holder end plate portion 33, the magnets 56 and 57 are brought into contact with the opening edges of each of the notches 48, which are provided on both sides of the board 47 of the stopper mechanism 27 in the direction of the first axis R1, respectively. Further, when the third magnet 58 and the fourth magnet 59 are fixed to the holder end plate portion 33, the magnets 58 and 59 are brought into contact with the opening edges of each of the notches 48, which are provided on both sides of the board 47 of the stopper mechanism 27 in the direction of the second axis R2, respectively. As a result, each of the magnets 56 to 59 is positioned on the movable body 10 in the circumferential direction and in the radial direction.

As illustrated in FIG. 11, a first shake corrective magnet 61 is fixed to the first side wall 35 of the holder frame portion 32. The first shake corrective magnet 61 is magnetized with two poles in the direction of the Z axis. A magnetic polarization line 61a of the first shake corrective magnet 61 extends in the circumferential direction. A second shake corrective magnet 62 is fixed to the third side wall 37. The second shake corrective magnet 62 is magnetized with two poles in the direction of the Z axis. A magnetic polarization line 62a of the second shake corrective magnet 62 extends in the circumferential direction. The first shake corrective magnet 61 and the second shake corrective magnet 62 are arranged so as to point the same pole in the direction of the Z axis.

A rolling corrective magnet 63 is fixed to the fourth side wall 38. The rolling corrective magnet 63 is magnetized with three poles in the circumferential direction. The rolling corrective magnet 63 includes a first magnetic polarization line 63a and a second magnetic polarization line 63b that extend in parallel to the direction of the Z axis. The first magnetic polarization line 63a is located in the −X direction of the second magnetic polarization line 63b. The rolling corrective magnet 63 is disposed on the side opposite to the second shake corrective magnet 62 with the optical axis L interposed therebetween.

Here, the first shake corrective magnet 61, the second shake corrective magnet 62, and the rolling corrective magnet 63 abut against the holder flange portion 34 from the +direction of the Z axis. That is, the holder flange portion 34 positions the first shake corrective magnet 61, the second shake corrective magnet 62, and the rolling corrective magnet 63 in the direction of the Z axis.

Note that, as illustrated in FIG. 9, a second stopper mechanism 98 is fixed to the stopper mechanism 27 in the +Z direction. The second stopper mechanism 98 will be described later.

Rotational Support Mechanism

As illustrated in FIGS. 13 and 14, the rotational support structure 12 includes the first annular groove 45 provided on the movable body 10 in a state of being coaxial with the optical axis L, and a plate roller 66 having a second annular groove 65 opposed to the first annular groove 45 in the direction of the Z axis. Further, the rotational support structure 12 includes a plurality of spherical objects 67 which are inserted into the first annular groove 45 and the second annular groove 65 and roll between the movable body 10 and the plate roller 66, and an annular retainer 68 which holds the spherical objects 67 so as to be rollable. Further, as illustrated in FIG. 9, the rotational support structure 12 includes a pressurization structure 69 that applies a force for bringing the first annular groove 45 and the second annular groove 65 closer to each other in the direction of the Z axis.

As illustrated in FIG. 10, the plate roller 66 includes a plate roller annular portion 70 that surrounds the optical axis L, a pair of plate roller extension portions 71 that protrude from the plate roller annular portion 70 toward both sides in the direction of the first axis R1, and a pair of plate roller protruding portions 76 that protrude from the plate roller annular portion 70 toward both sides in the direction of the second axis R2. The second annular groove 65 is provided on the plate roller annular portion 70.

More specifically, as illustrated in FIGS. 13 and 14, the plate roller 66 includes a plate roller main body portion 73 and a second rail member 74 having a second annular groove 65. The plate roller main body portion 73 includes an annular plate portion 75 that surrounds the optical axis L, the pair of plate roller extension portions 71 that protrude from the annular plate portion 75 toward both sides in the direction of the first axis R1, and the pair of plate roller protruding portions 76 that protrude from the annular plate portion 75 toward both sides in the direction of the second axis R2. The second rail member 74 is fixed to the annular plate portion 75, and surrounds the optical axis L.

Both of the second rail member 74 and the plate roller main body portion 73 are made of non-magnetic metal. The second rail member 74 is fixed to the annular plate portion 75 of the plate roller main body portion 73 by welding. As a result, the second rail member 74 and the annular plate portion 75 constitute the plate roller annular portion 70. Here, the second rail member 74 and the first rail member 26 are the same member. The second rail member 74 and the first rail member 26 are disposed coaxially with each other, so that the first annular groove 45 and the second annular groove 65 face each other in the direction of the Z axis.

Each of the spherical objects 67 is made of metal or a ceramic material. The retainer 68 is made of resin. The retainer 68 is located between the first rail member 26 and the second rail member 74 in the direction of the Z axis. The retainer 68 includes a plurality of spherical-object holding holes 68a that hold the spherical objects 67 so as to be rollable, respectively. In the present example, the rotational support structure 12 includes six spherical objects 67. The retainer 68 includes six spherical-object holding holes 68a provided at equal angular intervals. The spherical object 67 is held to be rollable inside the spherical-object holding hole 68a, and protrudes in the −Z direction and the +Z direction from the retainer 68.

Each of the pair of plate roller extension portions 71 includes a first portion of the plate roller extension portion 77 extending from the annular plate portion 75 in the direction of the first axis R1, a second portion of the plate roller extension portion 78 extending the first portion of the plate roller extension portion 77 and the outer circumference side of the movable body 10 toward the direction of the Z axis, and a third portion of the plate roller extension portion 79 connecting the first portion of the plate roller extension portion 77 and the second portion of the plate roller extension portion 78. The third portion of the plate roller extension portion 79 is bent in the −Z direction toward the direction away from the annular plate portion 75 in the direction of the first axis R1.

The first portion of the plate roller extension portion 77 is wider in the circumferential direction than the third portion of the plate roller extension portion 79 and the second portion of the plate roller extension portion 78. When viewed from the direction of the Z axis, steps 80 are provided on both sides in the circumferential direction between the first portion of the plate roller extension portion 77 and the third portion of the plate roller extension portion 79.

As illustrated in FIG. 6, the second portion of the plate roller extension portion 78 faces the movable body 10 with a slight gap on the outside of the movable body 10 in the direction of the first axis R1. As illustrated in FIGS. 6, 13 and 14, a gimbal frame receiving member 83 is fixed to each of the second portions of the plate roller extension portion 78 opposite to the movable body 10. As illustrated in FIG. 4, each of the gimbal frame receiving members 83 includes a spherical object 84 located on the outer circumference side (opposite side of the movable body 10) of each of the second portions of the plate roller extension portion 78, and a thrust receiving member 85 fixed to the second portion of the plate roller extension portion 78 on the outer circumference side. The thrust receiving member 85 fixed to the second portion of the plate roller extension portion 78 supports the spherical object 84 at a position separated from the second portion of the plate roller extension portion 78 on the first axis R1.

Figure 15A:
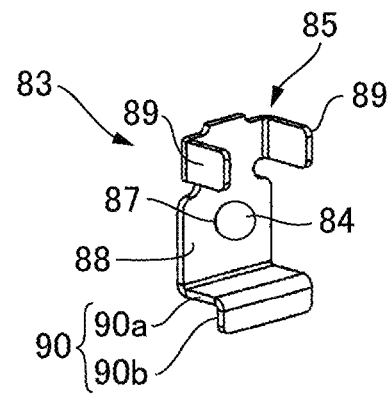
FIGS. 15A and 15B are perspective views of a gimbal frame receiving member.
Figure 15B:
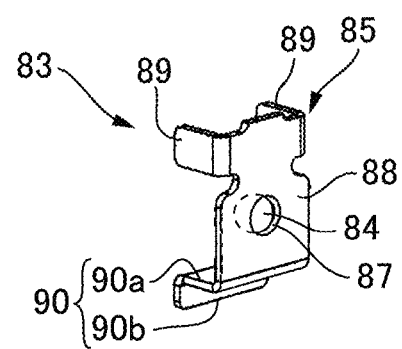

FIGS. 15A and 15B are perspective views of the gimbal frame receiving member. FIG. 15A is a perspective view of the gimbal frame receiving member 83 when viewed from the side where the spherical object 84 is located. FIG. 15B is a perspective view of the gimbal frame receiving member 83 when viewed from the side opposite to the side where the spherical object 84 is located. As illustrated in FIGS. 15A and 15B, the thrust receiving member 85 includes a plate 88 having a spherical object fixing portion 87 to which the spherical object 84 is fixed, a pair of arms 89 protruding to the side where the spherical object 84 is fixed from both ends in the circumferential direction in the +Z direction of the plate 88 from the spherical object fixing portion 87, and a foot 90 protruding from the end of the plate 88 in the −Z direction to the side where the spherical object 84 is fixed.

The plate 88 has a rectangular shape that is long in the direction of the Z axis as a whole. The spherical object fixing portion 87 is a circular through-hole provided in the plate 88. The inner diameter of the through-hole is smaller than the diameter of the spherical object 84. The spherical object 84 is fixed to the thrust receiving member 85 by welding while being partially inserted into the spherical object fixing portion 87. The foot 90 includes a protruding foot plate 90a protruding in a direction orthogonal to the annular plate portion 75 from the end of the plate 88 in the −Z direction, and a bent foot plate 90b bending in the −Z direction from the end of the protruding foot plate 90a on the side opposite to the plate 88. As illustrated in FIGS. 13 and 14, the gimbal frame receiving member 83 is fixed to the distal end of each of the arms 89 of the thrust receiving member 85, and the bent foot plate 90b is fixed to the second portion of the plate roller extension portion 78 by welding.

As illustrated in FIG. 9, the pressurization structure 69 includes a first magnetic component 91, a second magnetic component 92, a third magnetic component 93, and a fourth magnetic component, which are fixed at four locations in the circumferential direction of the plate roller 66, respectively. More specifically, the pressurization structure 69 includes the first magnetic component 91 fixed to one of the first portions of plate roller extension portion 77, and the second magnetic component 92 fixed to the other of the first portions of the plate roller extension portion 77. Further, the pressurization structure 69 includes the third magnetic component 93 fixed to one of the plate roller protruding portions 76, and a fourth magnetic component 94 fixed to the other of the plate roller protruding portions 76. The first magnetic component 91, the second magnetic component 92, the third magnetic component 93, and the fourth magnetic component 94 are the same component.

As illustrated in FIG. 13, the shape of each of the magnetic components 91 to 94 when viewed from the direction of the Z axis is symmetrical with respect to a virtual line M, which extends in the radial direction at the center in the circumferential direction. Further, each of the magnetic components 91 to 94 includes a wide portion 95 having a width in the radial direction wider than both ends in the circumferential direction at the center in the circumferential direction. The width of each of the magnetic components 91 to 94 in the radial direction gradually increases from both of the ends toward the wide portion 95. In the present example, each of the magnetic components 91 to 94 includes a rectangular portion 96 that is long in the circumferential direction and has a rectangular shape, and a trapezoidal portion 97 that is tapered inward in the radial direction from an edge on the inner circumferential side of the rectangular portion 96.

The first magnetic component 91 and the second magnetic component 92 are fixed to the plate roller extension portion 71 in the +Z direction (the side opposite to the holder end plate portion 33 in the direction of the Z axis). The third magnetic component 93 and the fourth magnetic component 94 are fixed to the plate roller protruding portion 76 in the +Z direction (the side opposite to the holder end plate portion 33 in the direction of the Z axis).

When a state in which the first magnetic component 91 and the second magnetic component 92 are fixed to the first portion of the plate roller extension portion 77 is viewed from the direction of the Z axis, both edges of the first magnetic component 91 and the second magnetic component 92 in the circumferential direction overlap with both edges of the first portion of the plate roller extension portion 77 in the circumferential direction. Further, a portion of the edge of the outer circumference side of the first magnetic component 91 and the second magnetic component 92 overlaps with the contour of the step 80 of the plate roller extension portion 71. Further, when a state in which the third magnetic component 93 and the fourth magnetic component 94 are fixed to the plate roller protruding portion 76 is viewed from the direction of the Z axis, both edges of the third magnetic component 93 and the fourth magnetic component 94 in the circumferential direction overlap with both edges of the plate roller protruding portion 76 in the circumferential direction. Further, the edge of the outer circumferential side of the third magnetic component 93 and the fourth magnetic component 94 overlap with the edge of the outer circumferential side of the plate roller protruding portion 76. That is, the shape of each of the first portions of the plate roller extension portion 77 functions as a positioning portion for positioning the first magnetic component 91 and the second magnetic component 92 in the circumferential direction and the radial direction. Further, the shape of the plate roller protruding portion 76 functions as a positioning portion for positioning the third magnetic component 93 and the fourth magnetic component 94 in the circumferential direction and the radial direction.

Further, as illustrated in FIGS. 6, 7, and 13, the pressurization structure 69 includes four magnets 56 to 59 fixed to the holder end plate portion 33 of the holder 25 of the movable body 10. Each of the four magnets 56 to 59 is arranged at the same angular position when the movable body 10 and the plate roller annular portion 70 of the plate roller 66 are overlapped with each other. That is, each of the magnets 56 to 59 overlaps with each of the four magnetic components 91 to 94 when viewed from the direction of the Z axis.

Here, as illustrated in FIG. 10, the notch 48 provided on one side of the board 47 of the stopper mechanism 27 in the direction of the first axis R1 serves as a first positioning portion for arranging the first magnet 56 at a position overlapping with the first magnetic component 91 when viewed from the direction of the Z axis. The notch 48 provided on the other side of the board 47 of the stopper mechanism 27 in the direction of the first axis R1 serves as a second positioning portion for arranging the second magnet 57 at a position overlapping with the second magnetic component 92 when viewed from the direction of the Z axis. The notch 48 provided on one side of the board 47 of the stopper mechanism 27 in the direction of the second axis R2 serves as a third positioning portion for arranging the third magnet 58 at a position overlapping with the third magnetic component 93 when viewed from the direction of the Z axis. The notch 48 provided on the other side of the board 47 of the stopper mechanism 27 in the direction of the second axis R2 serves as a fourth positioning portion for arranging the fourth magnet 59 at a position overlapping with the fourth magnetic component 94 when viewed from the direction of the Z axis.

The magnets 56 to 59 attract the magnetic components 91 to 94 that overlap with the respective magnets 56 to 59 in the direction of the Z axis, respectively. Accordingly, the pressurization structure 69 applies a force for bringing the first annular groove 45 and the second annular groove 65 closer to each other in the direction of the Z axis at four positions at equal angular intervals around the optical axis L. The movable body 10 is attracted to the plate roller 66 by the magnetic attraction force between each of the magnetic components 91 to 94 of the pressurization structure 69 and each of the magnets 56 to 59, and is rotatably supported by the plate roller 66 around the Z axis.

Here, as illustrated in FIG. 9, when the movable body 10 is rotatably supported by the plate roller 66 around the Z axis, the first bent portion 49 of the stopper mechanism 27 has a first-side stopper part 49a that faces one of the plate roller extension portions 71 with a gap from one side in the circumferential direction. The first-side stopper part 49a is an edge on one side of the first bent portion 49 in the circumferential direction. Further, the first bent portion 49 of the stopper mechanism 27 includes a second-side stopper part 49b that faces one of the plate roller protruding portions 76 with a gap from the other side in the circumferential direction. The second-side stopper part 49b is an edge on the other side of the first bent portion 49 in the circumferential direction.

Further, the movable body 10 includes a second stopper mechanism 98 fixed to the stopper mechanism 27. As illustrated in FIG. 10, the second stopper mechanism 98 includes an annular stopper part 99 surrounding the optical axis, a first connecting part 100 with a substantially rectangular shape protruding from the stopper part 99 in the +X direction, a second connecting part 101 protruding from the stopper part 99 in the −Y direction, and a third connecting part 102 protruding from the stopper part 99 in the +Y direction. In the second stopper mechanism 98, the first connecting part 100 is connected to the end of the first bent portion 49 of the stopper mechanism 27 in the +Z direction, the second connecting part 101 is connected to the end of the second bent portion 50 of the stopper mechanism 27 in the +Z direction, the third connecting part 102 is connected to the end of the third bent portion 51 of the stopper mechanism 27 in the +Z direction, and these are fixed by welding.

As illustrated in FIGS. 6 and 7, when the second stopper mechanism 98 is fixed to the stopper mechanism 27, the stopper part 99 faces the plate roller annular portion 70 with a predetermined gap from the direction of the Z axis on the side opposite to the second annular groove 65 of the plate roller annular portion 70 in the direction of the Z axis. The stopper part 99 prevents the movable body 10 from falling out from the plate roller 66 in the −Z direction.

Fixed Body

As illustrated in FIG. 8, the fixed body 11 includes a case 105 with a frame shape that surrounds the movable body 10 and the rotational support structure 12 from the outer circumference side. As illustrated in FIG. 1, the cover 4 covers the case 105 from the +Z direction. As illustrated in FIG. 3, the base 5 closes an opening of the case 105 in the −Z direction. The case 105, the cover 4, and the base 5 are made of metal. The cover 4 and the base 5 are fixed to the case 105 by welding.

The case 105 is made of non-magnetic metal. As illustrated in FIG. 8, the case 105 includes a frame plate portion 106 that surrounds the holder 25 from the outside in the radial direction, and a fixed body-side flange portion 107 that bends from the end of the frame plate portion 106 in the −Z direction and protrudes toward the outer circumference side. The frame plate portion 106 is oriented toward the thickness direction in the radial direction. The base 5 is fixed to the fixed body-side flange portion 107.

The frame plate portion 106 includes a first frame plate portion 111 extending toward the direction of the Y axis in the −X direction of the movable body 10, a second frame plate portion 112 extending toward the direction of the Y axis in the +X direction of the movable body 10, a third frame plate portion 113 extending toward the direction of the X axis in the −Y direction of the movable body 10, and a fourth frame plate portion 114 extending toward the direction of the X axis in the +Y direction of the movable body 10. In the frame plate portion 106, the second frame plate portion 112 and the third frame plate portion 113 are connected to each other by a fifth frame plate portion 115, which is inclined by 45 degree with respect to the second frame plate portion 112 and the third frame plate portion 113. In the frame plate portion 106, the first frame plate portion 111 and the fourth frame plate portion 114 are connected to each other by a sixth frame plate portion 116, which is inclined by 45 degree with respect to the first frame plate portion 111 and the fourth frame plate portion 114. The fifth frame plate portion 115 and the sixth frame plate portion 116 face each other in the direction of the second axis R2. The fifth frame plate portion 115 and the sixth frame plate portion 116 have a rectangular notch portion 106a at the end in the +Z direction. That is, the case 105 includes, in the edge in the +Z direction, the notch portion 106a in a portion overlapping with the second axis R2 when viewed from the direction of the Z axis.

The first frame plate portion 111 and the third frame plate portion 113 are connected by a seventh frame plate portion 117, which protrudes outward in the direction of the first axis R1. Therefore, the first frame plate portion 111 is offset from the seventh frame plate portion 117 in the +X direction. Further, the third frame plate portion 113 is offset from the seventh frame plate portion 117 in the +Y direction. The seventh frame plate portion 117 has a bent shape in which the direction of the first axis R1 protrudes toward the outer circumference side, then extends in the circumferential direction, and the direction of the first axis R1 bends toward the inner circumferential side. The fourth frame plate portion 114 and the second frame plate portion 112 are connected to each other by an eighth frame plate portion 118, which protrudes outward from the fourth frame plate portion 114 in the direction of the first axis R1. The fourth frame plate portion 114 is offset from the eighth frame plate portion 118 in the −Y direction. When viewed from the direction of the Z axis, the eighth frame plate portion 118 protrudes outward from the fourth frame plate portion 114 in the direction of the first axis R1, then extends in the circumferential direction, and is connected to the second frame plate portion 112.

A notch 112a with a rectangular shape is provided at an edge of the second frame plate portion 112 in the −Z direction. Here, a flexible printed board (not illustrated) is drawn out from the camera module 2 in the +X direction. The flexible printed board is drawn out to the outside of the case 105 via the notch 112a.

The gimbal frame receiving members 83 are fixed to an outer end face of the fifth frame plate portion 115 and an outer end face of the sixth frame plate portion 116, respectively. Each of the gimbal frame receiving members 83 is the same member as the gimbal frame receiving member 83 fixed to the second portion of the plate roller extension portion 78. Each of the gimbal frame receiving members 83 includes the spherical object 84 located on the outer circumference side of the frame plate portion 106 (on the side opposite to the movable body 10), and the thrust receiving member 85 that is fixed to the frame plate portion 106 on the outer circumference side and supports the spherical object 84 at a position separated from the frame plate portion 106 on the second axis R2. In each of the gimbal frame receiving members 83, the distal end of each of the arms 89 of the thrust receiving member 85 and the bent foot plate 90b are fixed by welding to the fifth frame plate portion 115 and the sixth frame plate portion 116, respectively.

A first shake-correction coil 121 is fixed to an outer surface of the first frame plate portion 111 (a surface on the side opposite to the movable body 10). A second shake-correction coil 122 is fixed to the outer surface of the third frame plate portion 113. Further, two rolling corrective coils 123 and 124 are fixed to the outer side surface of the fourth frame plate portion 114. The two rolling corrective coils 123 and 124 are arranged in the circumferential direction. Here, as illustrated in FIG. 3, the flexible printed board 9 is routed along the first frame plate portion 111, the second frame plate portion 112, and the fourth frame plate portion 114 on the outer circumference side of the first shake-correction coil 121, the second shake-correction coil 122, and the two rolling corrective coils 123 and 124. The first shake-correction coil 121, the second shake-correction coil 122, and the two rolling corrective coils 123 and 124 are electrically connected to the flexible printed board 9.

An oscillation position sensor 130 of the shake corrective-magnet drive structure 20 is provided on the flexible printed board 9. As illustrated in FIG. 8, the oscillation position sensor 130 includes a first Hall element 131 arranged at a position overlapping with the opening of the first shake-correction coil 121, and a second Hall element 132 arranged at a position overlapping with the opening of the second shake-correction coil 122, when viewed from the radial direction. The oscillation position sensor 130 detects an oscillation angle around the X axis of the movable body 10 on the basis of the output of the second Hall element 132 disposed at a position overlapping with the opening of the second shake-correction coil 122. Further, the oscillation position sensor 130 detects the oscillation angle around the Y axis of the movable body 10 on the basis of the output of the first Hall element 131 disposed at a position overlapping with the opening of the first shake-correction coil 121.

Further, the flexible printed board 9 is provided with a rotational position sensor 135 of the rolling corrective-magnet drive structure 23. The rotational position sensor 135 includes a Hall element 136 that overlaps with the opening of the rolling corrective coils 123 when viewed from the radial direction. The rotational position sensor 135 detects the angular position of the movable body 10 around the Z axis based on the output of the Hall element 136.

Further, as illustrated in FIG. 3, in the flexible printed board 9, a first magnetic plate 137 with a rectangular shape is fixed on the outer circumference side of the first shake-correction coil 121. Further, in the flexible printed board 9, a second magnetic plate 138 with a rectangular shape is disposed on the outer circumference side of the second shake-correction coil 122.

Gimbal Frame

Figure 16:
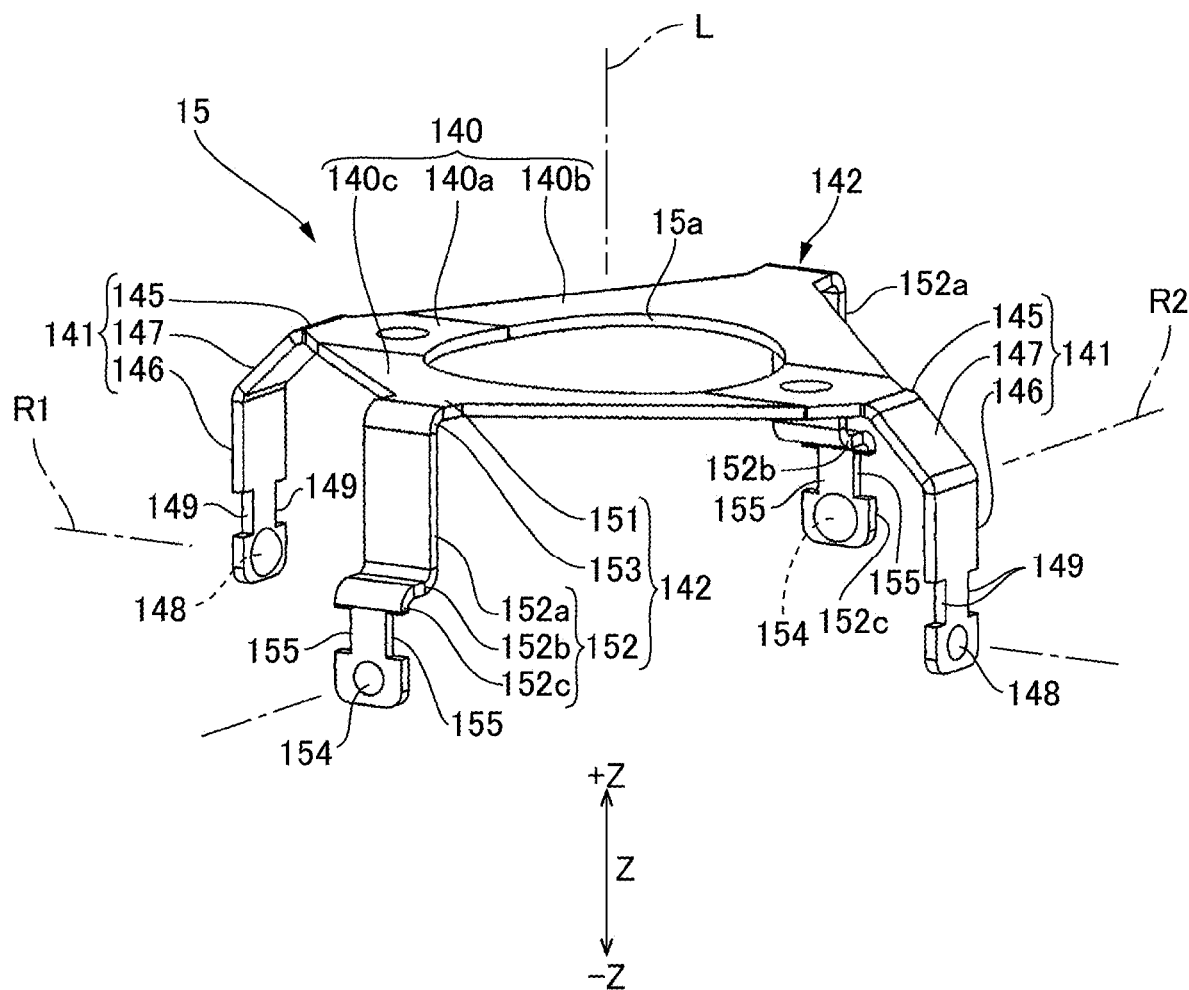
FIG. 16 is a perspective view of a gimbal frame.

FIG. 16 is a perspective view of the gimbal frame 15. The gimbal frame 15 is made of a metal leaf spring. As illustrated in FIG. 8, the gimbal frame 15 includes a main body 140 located in the +Z direction of the plate roller 66, a pair of first axis-side extension parts 141 that protrude from the main body 140 toward both sides in the direction of the first axis R1 and extends in the −Z direction, and a pair of second axis-side extension parts 142 that protrude from the main body 140 toward both sides in the direction of the second axis R2 and extends in the −Z direction. As illustrated in FIG. 14, the main body 140 includes a central portion 140a with a substantially rectangular shape that extends in the direction of the first axis R1, a first inclined portion 140b that is inclined in the +Z direction from one side of the central portion 140a in the direction of the second axis R2 (−Y direction side) toward the outer circumference side, and a second inclined portion 140c that is inclined in the +Z direction from the other side of the central portion 140a in the direction of the second axis R2 (+Y direction side) toward the outer circumference side. Further, the main body 140 includes an opening 15a, which penetrates in the direction of the Z axis in the center. As illustrated in FIG. 8, the camera module cylindrical portion 31 of the camera module 2 is located inside the opening 15a when viewed from the direction of the Z axis.

As illustrated in FIG. 16, each of the pair of first axis-side extension parts 141 includes a first portion of the first axis-side extension part 145 that extends in a direction away from the main body 140 in the direction of the first axis R1, a second portion of the first axis-side extension part 146 that extends the outer circumference side of the first portion of the first axis-side extension part 145 and the movable body 10 in the direction of the Z axis, and a third portion of the first axis-side extension part 147 that connects the first portion of the first axis-side extension part 145 and the second portion of the first axis-side extension part 146.

The first portion of the first axis-side extension part 145 protrudes from the central portion 140a in the direction of the first axis R1. The third portion of the first axis-side extension part 147 is inclined in the −Z direction from the leading edge of the first portion of the first axis-side extension part 145 toward the outer circumference side. The second portion of the first axis-side extension part 146 includes a first axis-side recessed curved surface 148 that recesses the direction of the first axis R1 in the inner circumference side toward the side of the movable body 10 on the first axis R1. Further, the second portion of the first axis-side extension part 146 includes a pair of rectangular notches 149 formed by cutting out edges on both ends in the circumferential direction in the +Z direction of the first axis-side recessed curved surface 148. By providing the pair of notches 149, the second portion of the first axis-side extension part 146 is provided with a portion having a narrow width in the circumferential direction in the +Z direction of the first axis-side recessed curved surface 148.

Next, each of the pair of second axis-side extension parts 142 includes a first portion of the second axis-side extension part 151 that extends in a direction away from the main body 140 in the direction of the second axis R2, a second portion of the second axis-side extension part 152 that extends the outer circumference side of the first portion of the second axis-side extension part 151 and the movable body 10 in the direction of the Z axis, and a third portion of the second axis-side extension part 153 that connects the first portion of the second axis-side extension part 151 and the second portion of the second axis-side extension part 152.

The pair of first portions of the second axis-side extension part 151 protrude in the direction of the second axis R2 from the respective edges of the outer circumference sides of the first inclined portion 140b and the second inclined portion 140c. The third portion of the second axis-side extension part 153 bends in the −Z direction from the edge of the outer circumferential side of the first portion of the second axis-side extension part 151. The second portion of the second axis-side extension part 152 includes a first portion 152a that extends the outside of the movable body 10 in the direction of the second axis R2 from the third portion of the second axis-side extension part 153 toward the direction of the Z axis, a bent portion 152b that bends outward in the radial direction from the edge of the first portion 152a in the −Z direction, and a second portion 152c that extends toward the −Z direction from the edge of the outer circumferential side of the bent portion 152b. The second portion 152c includes a second axis-side recessed curved surface 154 that recesses the direction of the second axis R2 in the inner circumferential side toward the movable body 10 on the second axis R2. Further, the second portion 152c includes a pair of rectangular notches 155 formed by cutting out edges at both ends in the circumferential direction in the +Z direction of the second axis-side recessed curved surface 154. By providing the pair of notches 155, the second portion 152c includes a portion having a narrow width in the circumferential direction in the +Z direction of the second axis-side recessed curved surface 154.

Assembly of Optical Unit with Shake-Correction Function

Figure 17:
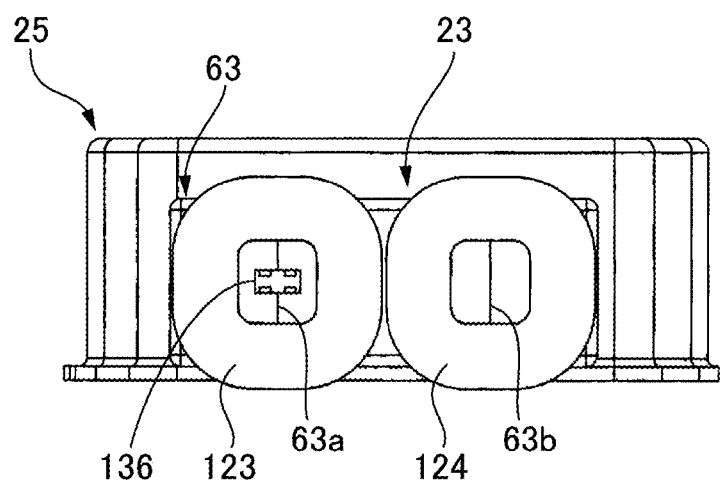
FIG. 17 is an explanatory diagram of a rolling drive structure.

FIG. 17 is an explanatory view of the rolling corrective-magnet drive structure 23 when viewed from the outside in the radial direction. In FIG. 17, the fourth frame plate portion 114 of the case 105 located between the rolling corrective magnet 63 and the two rolling corrective coils 123 and 124 is omitted.

When assembling the optical unit 1 with shake-correction function, as illustrated in FIG. 8, the second portion of the first axis-side extension part 146 of each of the first axis-side extension parts 141 of the gimbal frame 15 is inserted between the respective gimbal frame receiving members 83 fixed to both sides in the direction of the first axis R1 of the plate roller 66 and the plate roller 66. Then, as illustrated in FIG. 6, the first axis-side recessed curved surface 148 provided on each of the second portions of the first axis-side extension part 146 is set in a state of being in contact with the spherical object 84 of each of the gimbal frame receiving members 83. Accordingly, the first connecting mechanism 16 that connects the rotational support structure 12 and the gimbal frame 15 around the first axis R1 is configured. Further, at this time, set is a state in which the pair of arms 89 of the thrust receiving member 85 of each of the gimbal frame receiving members 83 are inserted into the pair of notches 149 provided on each of the second portions of the first axis-side extension part 146. This prevents the gimbal frame 15 from falling out from the gimbal frame receiving members 83 located on both sides in the direction of the first axis R1 toward the +Z direction.

Here, when the first axis-side recessed curved surface 148 of each of the first axis-side extension parts 141 is brought into contact with the spherical object 84 of each of the gimbal frame receiving members 83 on both sides in the direction of the first axis R1, the pair of first axis-side extension parts 141 are bent toward the inner circumference side of each other. Therefore, the second portion of the first axis-side extension part 146 is urged toward the outer circumference side, so that an urging force from the first axis-side extension part 141 acts on the gimbal frame receiving member 83 fixed to the plate roller 66 via the spherical object 84. Accordingly, the first axis-side recessed curved surface 148 of each of the first axis-side extension parts 141 and the spherical object 84 of each of the gimbal frame receiving members 83 can be maintained with a state of being in contact with each other.

Next, as illustrated in FIG. 4, the second portions 152c of each of the second axis-side extension parts 142 is inserted between the respective gimbal frame receiving members 83 fixed to both sides in the direction of the second axis R2 of the case 105 and the case 105. Then, as illustrated in FIG. 7, the second axis-side recessed curved surface 154 provided on each of the second portions 152c is set in a state of being in contact with the spherical object 84 of each of the gimbal frame receiving members 83. Accordingly, the second connecting mechanism 17 that connects the fixed body 11 and the gimbal frame 15 around the second axis R2 is configured. Further, at this time, set is a state in which the pair of arms 89 of the thrust receiving member 85 of each of the gimbal frame receiving members 83 are inserted into the pair of notches 155 provided in each of the second portions 152c. This prevents the gimbal frame 15 from falling out from the gimbal frame receiving members 83 located on both sides in the direction of the second axis R2 toward the +Z direction.

Here, when the second axis-side recessed curved surface 154 of each of the second axis-side extension parts 142 is brought into contact with the spherical object 84 of each of the gimbal frame receiving members 83 on both sides in the direction of the second axis R2, the pair of second axis-side extension parts 142 are bent toward the inner circumference side of each other. Therefore, the second portion 152c is urged toward the outer circumference side, so that an urging force from the second axis-side extension part 142 acts on each of the gimbal frame receiving members 83 fixed to the case 105 via the spherical object 84. Accordingly, the second axis-side recessed curved surface 154 of each of the second axis-side extension parts 142 and the spherical object 84 of each of the gimbal frame receiving members 83 can be maintained with a state of being in contact with each other.

In the state in which the second connecting mechanism 17 is configured, as illustrated in FIGS. 4 and 7, in the second portion of the second axis-side extension part 152 of each of the second axis-side extension parts 142 of the gimbal frame 15, the bent portion 152b is disposed inside the pair of notch portions 106a provided at both ends of the second axis R2 of the case 105 of the fixed body 11. Therefore, in the second portion of the second axis-side extension part 152, the first portion 152a extends toward the direction of the Z axis on the outer side of the movable body 10 in the direction of the second axis R2 on the inner circumferential side of the frame plate portion 106. The bent portion 152b overlaps with the frame plate portion 106 of the case 105 when viewed from the direction of the Z axis. The second portion 152c extends in the direction of the Z axis on the outer side of the frame plate portion 106 in the direction of the second axis R2.

As illustrated in FIG. 4, when the gimbal mechanism 13 is configured, the movable body 10 and the rotational support structure 12 are in a state of being disposed inside the case 105. When the gimbal mechanism 13 is configured, the movable body 10 is supported by the case 105 via the gimbal mechanism 13 and the rotational support structure 12. As a result, the movable body 10 can oscillate around an intersection P at which the optical axis L, the first axis R1, and the second axis R2 intersect with one another. As illustrated in FIGS. 6 and 7, the intersection P is positioned inside the camera module 2.

When the gimbal mechanism 13 is configured, as illustrated in FIG. 5, the first shake corrective magnet 61 and the first shake-correction coil 121 face each other in the direction of the X axis in a state where the first frame plate portion 111 is interposed therebetween. The first shake corrective magnet 61 and the first shake-correction coil 121 constitute the first shake corrective-magnet drive structure 21. Therefore, the movable body 10 rotates around the Y axis due to the power supply to the first shake-correction coil 121. Further, the second shake corrective magnet 62 and the second shake-correction coil 122 face each other in the direction of the X axis in a state in which the third frame plate portion 113 is interposed therebetween. The second shake corrective magnet 62 and the second shake-correction coil 122 constitute the second shake corrective-magnet drive structure 22. Therefore, the movable body 10 rotates around the X axis due to the power supply to the second shake-correction coil 122. The shake corrective-magnet drive structure 20 rotates the movable body 10 around the first axis R1 and the second axis R2 by combining the rotation of the movable body 10 around the Y axis by the first shake corrective-magnet drive structure 21 with the rotation of the movable body 10 around the X axis by the second shake corrective-magnet drive structure 22.

Further, when the gimbal mechanism 13 is configured, the rolling corrective magnet 63 and the two rolling corrective coils 123 and 124 face each other in the direction of the Y axis in a state where the fourth frame plate portion 114 is interposed therebetween. The rolling corrective magnet 63 and the two rolling corrective coils 123 and 124 constitute the rolling corrective-magnet drive structure 23. Therefore, the movable body 10 rotates around the Z axis due to the power supply to the two rolling corrective coils 123 and 124.

Here, when the state in which the gimbal mechanism 13 is configured is viewed from the radial direction, the magnetic polarization line 61a of the first shake corrective magnet 61 extending in the circumferential direction and the opening of the first shake-correction coil 121 overlap with each other. Therefore, the pair of coil portions extending in the circumferential direction in the first shake-correction coil 121 serves as an effective side for exerting a driving force around the Y axis. Further, the first shake corrective magnet 61 and the first magnetic plate 137 overlaps with each other. The first shake corrective magnet 61 and the first magnetic plate 137 constitute a magnetic spring for returning the movable body 10 to a reference angular position in the rotation direction around the Y axis. Further, the first Hall element 131 of the oscillation position sensor 130 and the magnetic polarization line 61a of the first shake corrective magnet 61 overlap with each other. Therefore, the oscillation position sensor 130 can acquire the angular position in the rotational direction around the Y axis based on the output from the first Hall element 131.

Further, the magnetic polarization line 62a of the second shake corrective magnet 62 extending in the circumferential direction overlaps with the opening of the second shake-correction coil 122. Therefore, the pair of coil portions extending in the circumferential direction in the second shake-correction coil 122 serves as an effective side to exert a driving force to the movable body 10 around the X axis. Further, the second shake corrective magnet 62 and the second magnetic plate 138 overlaps with each other. The second shake corrective magnet 62 and the second magnetic plate 138 constitute a magnetic spring for returning the movable body 10 to the reference angular position in the rotation direction around the X axis. Further, the second Hall element 132 of the oscillation position sensor 130 and the magnetic polarization line 62a of the second shake corrective magnet 62 overlap with each other. Therefore, the oscillation position sensor 130 can acquire the angular position in the rotational direction around the X axis based on the output from the second Hall element 132.

Further, as illustrated in FIG. 17, the first magnetic polarization line 63a of the rolling corrective magnet extending in the direction of the Z axis overlaps with the opening of the rolling corrective coil 123. Further, the second magnetic polarization line 63b of the rolling corrective magnet extending in the direction of the Z axis overlaps with the opening of the other rolling corrective coil 124. Therefore, in each of the rolling corrective coils 123 and 124, the pair of coil portions extending in the direction of the X axis serves as an effective side that exerts a driving force for rotating the movable body 10 around the Z axis. Further, the Hall element 136 of the rotational position sensor 135 overlaps with the first magnetic polarization line 63a. Therefore, the rotational position sensor 135 can acquire the angular position in the rotational direction around the X axis based on the output from the Hall element 136.

Next, the cover 4 covers the case 105 from the direction of the Z axis, and these are fixed by welding. As illustrated in FIGS. 1, 2, and 7, when the state in which the cover 4 is fixed to the case 105 is viewed from the +Z direction, in the object-side end plate portion 8 of the cover 4, the portions located at both ends in the direction of second axis R2 and the bent portions 152b of the gimbal frame 15 face each other in the direction of the Z axis. Accordingly, the object-side end plate portion 8 serves as a retaining portion for preventing the gimbal frame 15 and the movable body 10 from falling out from the fixed body 11 toward the +Z direction in the direction of the Z axis.

Function and Effect

According to the present examples, the rotational support structure 12, which rotatably supports the movable body 10 around the Z axis, is rotatably supported by the gimbal mechanism 13 around the first axis R1 and the second axis R2. Therefore, even when the movable body 10 rotates around the first axis R1 or the second axis R2, the movable body 10 can be rotated around the rotational axis that coincides with the optical axis L. Further, the rotational support structure 12 includes the plurality of spherical objects 84 that are inserted into the first annular groove 45 provided on the movable body 10 and the second annular groove 65 provided on the plate roller 66 and roll. Therefore, the rotational axis of the movable body 10 does not become unstable as compared with the case where the movable body 10 is rotatably supported by the plurality of leaf springs. Further, in the rotational support structure 12, the first annular groove 45 that faces the second annular groove 65 of the plate roller 66 in the direction of the Z axis is provided on the movable body 10. Therefore, as compared with the case where the first annular groove 45 is provided on a member separate from the movable body 10, it is possible to reduce the size of the rotational support structure 12 in the direction of the Z axis.

Further, the movable body 10 includes the first-side stopper part 49a that faces the plate roller extension portion 71 supported on the first axis R1 by the gimbal mechanism 13, with a gap from one side in the circumferential direction. Therefore, it is possible to define the angular range in which the movable body 10 rotates on one side around the Z axis by the first-side stopper part 49a.

Further, the movable body 10 includes the holder 25 made of metal that holds the camera module 2, the annular first rail member 26 that is fixed to the holder 25 and surrounds the optical axis L, and the stopper mechanism 27 fixed to the holder 25. The first rail member 26 is made of metal, and includes the first annular groove 45. The stopper mechanism 27 is made of metal, and includes the first-side stopper part 49a. Thereby, the first-side stopper part 49a and the first annular groove 45 are provided on a different member from the holder 25. Therefore, the shape of the holder 25 can be simplified as compared with the case where the holder 25 is provided with the first-side stopper part 49a and the first annular groove 45. Accordingly, it becomes easy to manufacture the holder 25. Further, since the holder 25 and the stopper mechanism 27 are made of metal, these can be fixed by welding. Therefore, even when a force is applied to the stopper mechanism 27 from the circumferential direction by the first-side stopper part 49a abutting against the plate roller 66, it is easy to prevent the stopper mechanism 27 from falling out from the holder 25. Further, since the stopper mechanism 27 is made of metal, it is possible to prevent dust from being generated from the stopper mechanism 27 even when the first-side stopper part 49a abuts against the plate roller 66.

Further, the rotational support structure 12 includes the pressurization structure 69 that applies a force to bring the first annular groove 45 and the second annular groove 65 closer to each other in the direction of the Z axis. The plate roller 66 is non-magnetic. The pressurization structure 69 includes the first magnetic component 91 fixed to one of the plate roller extension portions 71, the second magnetic component 92 fixed to the other of the plate roller extension portions 71, and the first magnet 56 and the second magnet 57 fixed to the holder 25. The stopper mechanism 27 includes the first positioning portion (notch 48) for arranging the first magnet 56 at a position overlapping with the first magnetic component 91 when viewed from the direction of the Z axis, and the second positioning portion (notch 48) for arranging the second magnet 57 at a position overlapping with the second magnetic component 92 when viewed in the direction of the Z axis. Therefore, it becomes easy to fix the magnets of the pressurization structure 69 to the holder 25.

In the present example, the plate roller 66 includes the plate roller protruding portion 76, which protrudes from the plate roller annular portion 70 toward the outer circumferential side between the pair of plate roller extension portions 71 in the circumferential direction. The movable body 10 includes the second-side stopper part 49b that faces the plate roller protruding portion 76 with a gap from the other side in the circumferential direction. The second-side stopper part 49b is provided on the stopper mechanism 27. In this way, it is possible to define the angular range in which the movable body 10 rotates around the Z axis on the other side by the second-side stopper part 49b.

Further, the pressurization structure 69 includes the third magnetic component 93 and the fourth magnetic component 94 which are fixed to the plate roller protruding portion 76, and the third magnet 58 and the fourth magnet 59 which are fixed to the holder 25. Therefore, it becomes easier to secure a force for causing the first annular groove 45 and the second annular groove 65 to approach each other in the direction of the Z axis by the pressurization structure 69. Further, the stopper mechanism 27 includes the third positioning portion (notch 48) for arranging the third magnet 58 at a position overlapping with the third magnetic component 93 when viewed from the direction of the Z axis. Further, the stopper mechanism 27 includes the third positioning portion (notch 48) for arranging the fourth magnet 59 at a position overlapping with the fourth magnetic component 94 when viewed from the direction of the Z axis. Therefore, it becomes easy to fix the third magnet 58 and the fourth magnet 59 to the holder 25.

Further, the movable body 10 includes the second stopper mechanism 98 fixed to the stopper mechanism 27. The second stopper mechanism 98 includes the stopper part 99, which faces the plate roller annular portion 70 with the predetermined gap from the direction of the Z axis on the side opposite to the second annular groove 65 of the plate roller annular portion 70 in the direction of the Z axis. Therefore, it is possible to prevent the spherical object 84 from falling out from between the movable body 10 and the plate holder 25 by the first annular groove 45 and the second annular groove 65 being excessively spaced apart from each other in the Z-axis direction.

Further, the holder 25 is made of a magnetic material, and includes the rolling corrective-magnet drive structure 23 that rotates the movable body 10 around the Z axis. The rolling corrective-magnet drive structure 23 includes the rolling corrective magnet fixed to the holder 25, and the rolling corrective coil fixed to the fixed body 11. When the metal holder 25 is made of the magnetic material, the holder 25 functions as a yoke of the rolling corrective magnet. Therefore, it is easy to secure the driving force of the rolling corrective-magnet drive structure 23.

Modified Examples

Figure 18:
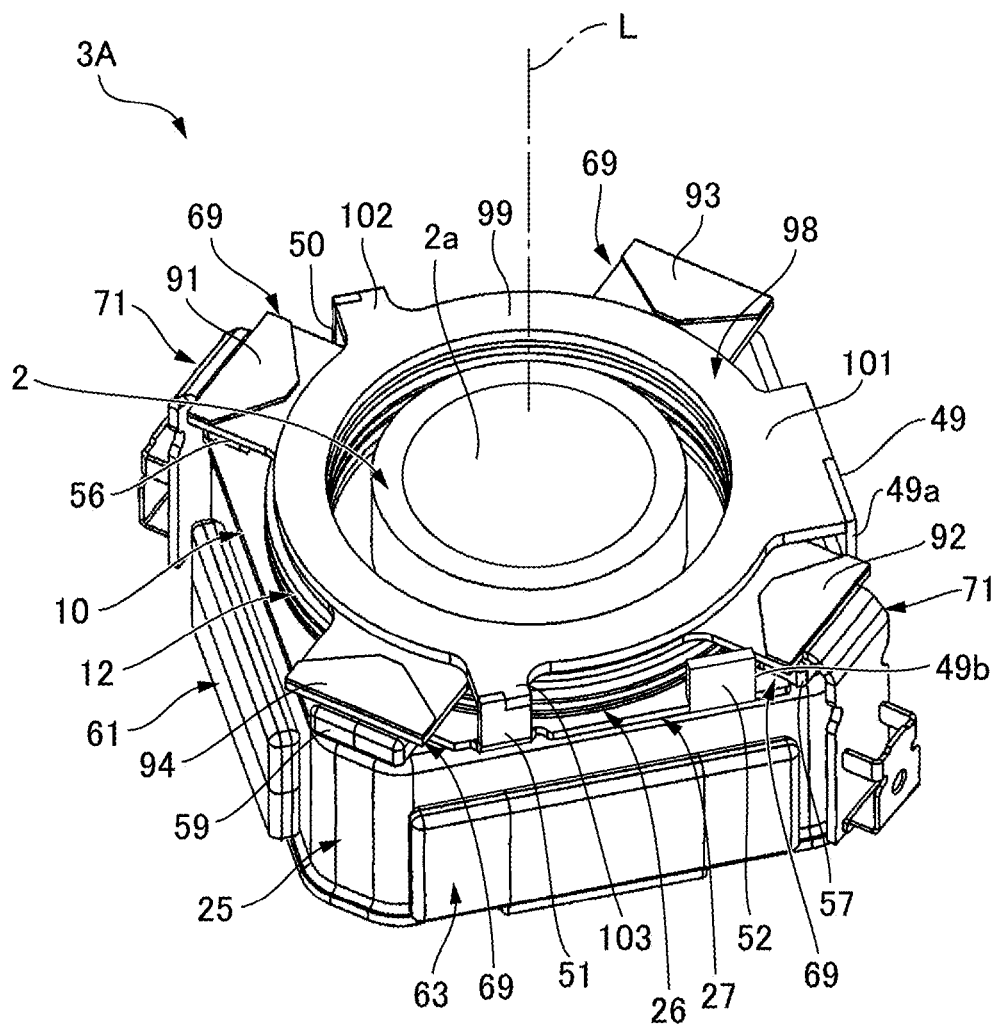
FIG. 18 is an explanatory view of an optical unit main body of a first modified example in which the location of a second-side stopper part is changed.
Figure 18:
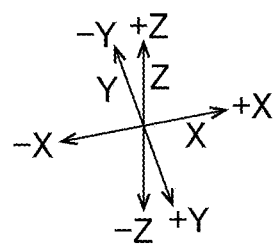
Figure 19:
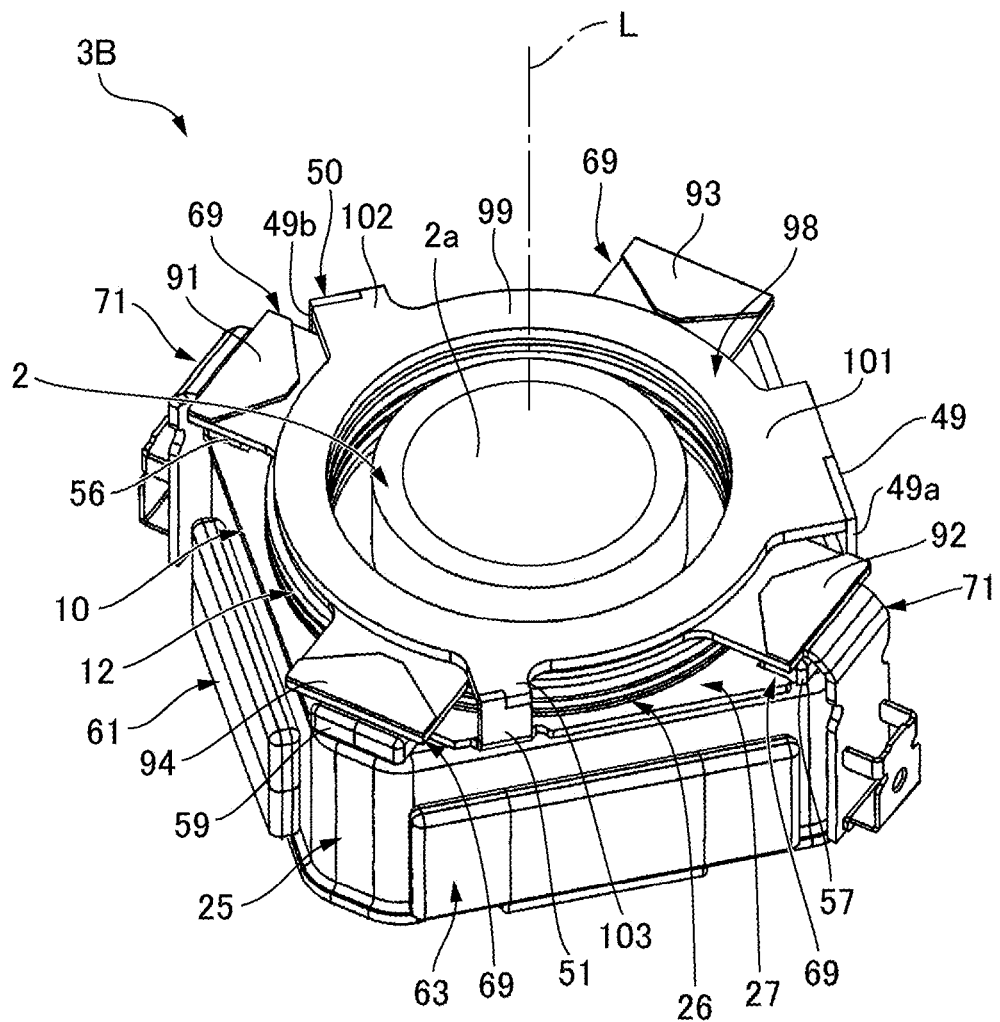
FIG. 19 is an explanatory view of an optical unit main body of a second modified example in which the location of the second-side stopper part is changed.
Figure 19:
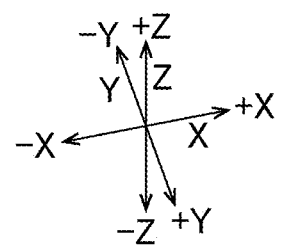

FIG. 18 is an explanatory view of an optical unit main body of a first modified example in which the position of the second-side stopper part 49b is changed. FIG. 19 is an explanatory view of an optical unit main body of a second modified example in which the position of the second-side stopper part 49b is changed. As illustrated in FIG. 18, in an optical unit main body 3A of the first modified example, the movable body 10 includes the second-side stopper part 49b that faces one of the plate roller extension portions 71 from the other side in the circumferential direction, instead of the second-side stopper part 49b described above. That is, the movable body 10 includes the first-side stopper part 49a and the second-side stopper part 49b on both sides of the one of the plate roller extension portions 71 in the circumferential direction. More specifically, the stopper mechanism 27 includes a fourth bent portion 52 that bends in the +Z direction from the outer circumferential side portion of the opening 47a located in the +Y direction on the edge of the outer circumferential side of the board 47. The edge on the side of the one of the plate roller extension portions 71 of the fourth bent portion 52 is the second-side stopper part 49b. In this case as well, it is possible to define the angular range in which the movable body 10 rotates on the other side around the Z axis by the second-side stopper part 49b.

As illustrated in FIG. 19, in an optical unit main body 3B of the second modified example, the movable body 10 includes the second-side stopper part 49b that faces the other of the plate roller extension portions 71 with a gap from the other side in the circumferential direction, instead of the second-side stopper part 49b described above with. In the present example, the second bent portion 50 is extended toward the side of the other of the plate roller extension portions 71. Then, the edge of the second bent portion 50 on the side of the other of the plate roller extension portions 71 is referred to as the second-side stopper part 49b. In this case as well, it is possible to define the angular range in which the movable body 10 rotates on the other side around the Z axis by the second-side stopper part 49b.

Further, the pressurization structure 69 may include four magnets fixed to the plate roller 66 instead of the magnetic components 91 to 94. Each of the magnets is disposed at a position overlapping with each of the magnets 56 to 59 when viewed from the direction of the Z axis.

Further, although the magnetic components and the magnets of the pressurization structure 69 are provided at four locations around the optical axis L, these may be provided at two locations on both sides sandwiching the optical axis L.

Note that, the first annular groove 45 may be formed on the holder end plate portion 33 of the holder 25. Further, the second annular groove 65 may be formed on the annular plate portion 75 of the plate roller main body portion 73.

What is claimed is:

1. An optical unit with shake-correction function, the optical unit comprising:
a movable body comprising a camera module;
a rotational support structure, configured to rotatably support the movable body around an optical axis of a lens of the camera module;
a gimbal mechanism, configured to rotatably support the rotational support structure around a first axis intersecting the optical axis, and around a second axis intersecting the optical axis and the first axis; and
a fixed body, configured to support the movable body via the gimbal mechanism and the rotational support structure,
wherein the rotational support structure comprises:
a first annular groove, being provided on the movable body in a state of being coaxial with the optical axis;

a plate roller, comprising a second annular groove facing the first annular groove in a direction of the optical axis; and a plurality of spherical objects, being inserted into the first annular groove and the second annular groove to roll between the movable body and the play roller, wherein the plate roller comprises:

a plate roller annular portion, comprising the second annular groove; and a pair of plate roller extension portions, being protruded from the plate roller annular portion toward both sides in a direction of the first axial, wherein the gimbal mechanism is configured to rotatably support each of the pair of plate roller extension portions around the first axis on the first axis, and wherein the movable body comprises a first-side stopper part to face one of the pair of plate roller extension portions with a gap from one side in a circumferential direction around the optical axis.

2. The optical unit with shake-correction function according to claim 1, wherein the movable body comprises: a second-side stopper part, configured to face one of the pair of plate roller extension portions with a gap from the other side in the circumferential direction.

3. The optical unit with shake-correction function according to claim 1, wherein the movable body comprises: a second-side stopper part, configured to face the other of the pair of plate roller extension portions with a gap from the other side in the circumferential direction.

4. The optical unit with shake-correction function according to claim 1, wherein the movable body comprises;

a holder made of metal, configured to hold the camera module;

an annular first rail member, configured to be fixed to the holder and surround the optical axis; and a stopper mechanism, being fixed to the holder, wherein the first rail member comprises the first annular groove, and wherein the stopper mechanism is made of metal and comprises the first-side stopper part.

5. The optical unit with shake-correction function according to claim 4, wherein the rotational support structure comprises a pressurization structure, configured to apply a force for bringing the first annular groove and the second annular groove closer to each other in the direction of the optical axis, wherein the plate roller is non-magnetic, wherein the pressurization structure comprises:

a first magnetic component, being fixed to one of the pair of plate roller extension portions;

a second magnetic component, being fixed to the other of the pair of plate roller extension portions; and a first magnet and a second magnet which are fixed to the holder, and wherein the stopper mechanism comprises:

a first positioning portion, configured to arrange the first magnet at a position overlapping with the first magnetic component when viewed from the direction of the optical axis; and a second positioning portion, configured to arrange the second magnet in a position overlapping with the second magnetic component when viewed from the direction of the optical axis.

6. The optical unit with shake-correction function according to claim 5, wherein the plate roller comprises: a plate roller protruding portion, configured to be protruded from the plate roller annular portion toward an outer circumference side between the pair of plate roller extension portions in the circumferential direction, wherein the movable body comprises: a second-side stopper part, configured to face the plate roller protruding portion with a gap from the other side in the circumferential direction, and wherein the second-side stopper part is provided on the stopper mechanism.

7. The optical unit with shake-correction function according to claim 6, wherein the pressurization structure comprises:

a third magnetic component, being fixed to the plate roller protruding portion; and a third magnet, being fixed to the holder, and wherein the stopper mechanism comprises: a third positioning portion, configured to arrange the third magnet at a position overlapping with the third magnetic component when viewed from the direction of the optical axis.

8. The optical unit with shake-correction function according to claim 4, wherein the movable body comprises: a second stopper mechanism, being fixed to the stopper mechanism, and wherein the second stopper mechanism comprises: a stopper part, configured to face the plate roller annular portion with a predetermined gap from the direction of the optical axis on the side opposite to the second annular groove of the plate roller annular portion in the direction of the optical axis.

9. The optical unit with shake-correction function according to claim 4, wherein the holder is made of a magnetic material, wherein the optical unit further comprises: a rolling corrective-magnet drive structure, configured to rotate the movable body around the optical axis, and wherein the rolling corrective-magnet drive structure comprises:

a rolling corrective magnet, being fixed to the holder; and a rolling corrective coil, being fixed to the fixed body.

* * * * *